United States Patent
Zhai et al.

(10) Patent No.: US 10,902,412 B2
(45) Date of Patent: Jan. 26, 2021

(54) METHOD AND DEVICE FOR ACCOUNT CREATION, ACCOUNT REFILLING AND DATA SYNCHRONIZATION

(71) Applicant: Advanced New Technologies Co., Ltd., George Town (KY)

(72) Inventors: Fen Zhai, Hangzhou (CN); Chunlei Gu, Hangzhou (CN); Lingnan Shen, Hangzhou (CN); Ge Chen, Hangzhou (CN); Jie Qi, Hangzhou (CN); Huifeng Jin, Hangzhou (CN); Xuefu Song, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 16/698,327

(22) Filed: Nov. 27, 2019

(65) Prior Publication Data

US 2020/0097947 A1    Mar. 26, 2020

Related U.S. Application Data

(63) Continuation of application No. PCT/CN2018/099869, filed on Aug. 10, 2018.

(30) Foreign Application Priority Data

Aug. 16, 2017    (CN) .......................... 2017 1 0701052

(51) Int. Cl.
  *G06Q 20/32*    (2012.01)
  *G06F 16/27*    (2019.01)
(52) U.S. Cl.
  CPC ......... *G06Q 20/3278* (2013.01); *G06F 16/27* (2019.01)

(58) Field of Classification Search
  CPC .... G06Q 20/00; G06Q 20/32; G06Q 20/3278; G06Q /
  (Continued)

(56) References Cited

U.S. PATENT DOCUMENTS

2003/0218484 A1* 11/2003 Graciannette ....... G06F 13/4217
  327/156
2005/0235167 A1* 10/2005 Tiotantra .............. G06F 1/3268
  713/300

(Continued)

FOREIGN PATENT DOCUMENTS

CN    101201956    6/2008
CN    101252729    8/2008
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Robert R Niquette
*Assistant Examiner* — Liz P Nguyen
(74) *Attorney, Agent, or Firm* — Fish & Richardson P.C.

(57) ABSTRACT

Disclosed herein are methods, systems, and apparatus, including computer programs encoded on computer storage media, for data synchronization. One of the methods includes that a first terminal device establishes a data channel to a specified carrier through near field communication. The first terminal device obtains an account identifier of a first account and first streaming data corresponding to the first account through the data channel, where the account identifier of the first account and the first streaming data are stored in the specified carrier. The first terminal device determines second streaming data corresponding to a second (Continued)

account associated with the first account, and performs data synchronization between the first account and the second account based on the first streaming data and the second streaming data.

20 Claims, 18 Drawing Sheets

(58) Field of Classification Search
USPC .......................................................... 705/41
See application file for complete search history.

(56) References Cited

U.S. PATENT DOCUMENTS

| | | |
|---|---|---|
| 2011/0220718 A1 | 9/2011 | Dixon et al. |
| 2012/0234911 A1* | 9/2012 | Yankovich ............. G06Q 20/28 235/379 |
| 2013/0222583 A1* | 8/2013 | Earnshaw ........ H04N 21/47202 348/143 |
| 2014/0247864 A1* | 9/2014 | Stone ................... H04N 21/236 375/240.02 |
| 2015/0112860 A1 | 4/2015 | Wang et al. |
| 2015/0142657 A1 | 5/2015 | Sagastiverza et al. |
| 2016/0140596 A1* | 5/2016 | Green ................. G06Q 30/0226 705/14.27 |
| 2016/0197904 A1 | 7/2016 | Taratine et al. |
| 2017/0053277 A1 | 2/2017 | Dutt et al. |
| 2017/0161724 A1 | 6/2017 | Lau |
| 2018/0139668 A1* | 5/2018 | Takahashi ......... H04W 72/1294 |

FOREIGN PATENT DOCUMENTS

| | | | |
|---|---|---|---|
| CN | 101799954 | 8/2012 | |
| CN | 103577983 | 2/2014 | |
| CN | 105096452 | 11/2015 | |
| CN | 105205659 | 12/2015 | |
| CN | 105590202 | 5/2016 | |
| CN | 105631657 | 6/2016 | |
| CN | 106134163 | 11/2016 | |
| CN | 104392347 | 12/2017 | |
| CN | 107657448 | 2/2018 | |
| EP | 2378437 A1 * | 10/2011 | ............ G06Q 10/00 |
| TW | 201626286 | 7/2016 | |
| WO | WO 2016076812 | 5/2016 | |
| WO | WO-2016076812 A1 * | 5/2016 | ......... G06Q 20/3278 |

OTHER PUBLICATIONS

Nakamoto, "Bitcoin: A Peer-to-Peer Electronic Cash System," www.bitcoin.org, 2005, 9 pages.
International Search Report and Written Opinion in International Application No. PCT/CN2018/099869 dated Nov. 13, 2018; 11 pages.
Extended European Search Report in European Application No. 18846030.7, dated Apr. 6, 2020, 9 pages.
PCT International Preliminary Report on Patentability in International Application No. PCT/CN2018/099869, dated Feb. 18, 2020, 12 pages. (with English translation).

* cited by examiner

METHOD AND DEVICE FOR ACCOUNT CREATION, ACCOUNT REFILLING AND DATA SYNCHRONIZATION

CROSS REFERENCE TO RELATED APPLICATIONS

This application is a continuation of PCT Application No. PCT/CN2018/099869, filed on Aug. 10, 2018, which claims priority to Chinese Patent Application No. 201710701052.5, filed on Aug. 16, 2017, and each application is hereby incorporated by reference in its entirety.

TECHNICAL FIELD

The present application relates to the field of Internet information processing technologies and the field of computer technologies, and in particular, to a method and device for account creation, account refilling and data synchronization.

BACKGROUND

As a conventional payment method, cash payment is a payment method familiar to people living in modern society. However, in some fields (for example, public transportation and supermarket shopping fields), cash payment causes some inconveniences to people (for example, people needs to prepare a sufficient amount of change).

To solve these inconveniences, earmarking payment appears. Earmarking payment can be understood as follows: A user directly earmarks money in a bank account or cash into a specified integrated circuit card (IC card), and then uses the specified IC card for consumption. This method can also be referred to as an electronic wallet. However, currently, related earmarking operations usually need to be performed in a specific device to implement earmarking.

Based on this payment method, a more convenient processing method is urgently needed to improve convenience of earmarking payment.

SUMMARY

In view of this, implementations of the present application provide a method and device for account creation, account refilling and data synchronization, to improve convenience of earmarking payment.

The implementations of the present specification provide the following technical solutions.

The implementations of the present specification provide an account creation method, including: obtaining, by a first terminal device, an account identifier of a first account from a specified carrier by using a predetermined method; creating, by the first terminal device, an account identifier of a second account based on the account identifier of the first account; and establishing and storing, by the first terminal device, a mapping relationship between the account identifier of the first account and the account identifier of the second account.

The implementations of the present specification provide an account refilling method, including: establishing, by a first terminal device, a data channel to a specified carrier including an account identifier of a first account by using a near field communications technology; and writing, by the first terminal device, refilling data of a second account into the specified carrier through the data channel, to refill the first account.

The implementations of the present specification provide an account refilling method, including: receiving, by a specified carrier, refilling data sent by a first terminal device when a data channel is established to the first terminal device by using a near field communications technology; and processing balance data of a first account based on the refilling data.

The implementations of the present specification provide a data synchronization method, where an association relationship is established between a primary account included in a server and each of a first account included in a specified carrier and a second account included in a first terminal device, and the method includes: obtaining, by the server through near field communication, an account identifier of the first account and first streaming data corresponding to the first account from the specified carrier; receiving, by the server, an account identifier of the second account and second streaming data corresponding to the second account that are sent by the first terminal device; and determining, by the server, synchronization data in a synchronization period based on the first streaming data and the second streaming data, and sending the synchronization data to the first terminal device, so that data corresponding to the second account is consistent with data corresponding to the primary account.

The implementations of the present specification provide a data synchronization method, including: establishing, by a first terminal device, a data channel to a specified carrier through near field communication; and synchronizing, by the first terminal device, balance data corresponding to a second account to the specified carrier through the data channel, so that data corresponding to a first account included in the specified carrier is consistent with data corresponding to the second account.

The implementations of the present specification provide a data synchronization method, including: establishing, by a first terminal device, a data channel to a specified carrier through near field communication; obtaining, by the first terminal device through the data channel, an account identifier of a first account and first streaming data corresponding to the first account that are included in the specified carrier; determining, by the first terminal device, second streaming data corresponding to a second account associated with the first account; and performing, by the first terminal device, data synchronization between the first account and the second account based on the first streaming data and the second streaming data.

The implementations of the present specification provide an account creation device, including: an obtaining unit, configured to obtain an account identifier of a first account from a specified carrier by using a predetermined method; a creation unit, configured to create an account identifier of a second account based on the account identifier of the first account; and a storage unit, configured to establish and store a mapping relationship between the account identifier of the first account and the account identifier of the second account.

The implementations of the present specification provide an account refilling device, including: an establishment unit, configured to establish a data channel to a specified carrier including an account identifier of a first account by using a near field communications technology; and a refilling unit, configured to write refilling data of a second account into the specified carrier through the data channel, to refill the first account.

The implementations of the present specification provide an account refilling device, including: a receiving unit, configured to receive refilling data sent by a first terminal device when a data channel is established to the first terminal device by using a near field communications technology; and a processing unit, configured to process balance data of a first account based on the refilling data.

The implementations of the present specification provide a data synchronization device, where an association relationship is established between a primary account included in a server and each of a first account included in a specified carrier and a second account included in a first terminal device, and the device includes: an obtaining unit, configured to obtain, through near field communication, an account identifier of the first account and first streaming data corresponding to the first account from the specified carrier; a receiving unit, configured to receive an account identifier of the second account and second streaming data corresponding to the second account that are sent by the first terminal device; and a synchronization unit, configured to determine synchronization data in a synchronization period based on the first streaming data and the second streaming data, and send the synchronization data to the first terminal device, so that data corresponding to the second account is consistent with data corresponding to the primary account.

The implementations of the present specification provide a data synchronization device, including: an establishment unit, configured to establish a data channel to a specified carrier through near field communication; and a synchronization unit, configured to synchronize balance data corresponding to a second account to the specified carrier through the data channel, so that data corresponding to a first account included in the specified carrier is consistent with data corresponding to the second account.

The implementations of the present specification provide a data synchronization device, including: an establishment unit, configured to establish a data channel to a specified carrier through near field communication; an obtaining unit, configured to obtain, through the data channel, an account identifier of a first account and first streaming data corresponding to the first account that are included in the specified carrier; a determining unit, configured to determine second streaming data corresponding to a second account associated with the first account; and a synchronization unit, configured to perform data synchronization between the first account and the second account based on the first streaming data and the second streaming data.

The implementations of the present specification provide an account creation device, including at least one memory and at least one processor, where the memory stores a program, and the processor is configured to perform the following steps: obtaining an account identifier of a first account from a specified carrier by using a predetermined method; creating an account identifier of a second account based on the account identifier of the first account; and establishing and storing a mapping relationship between the account identifier of the first account and the account identifier of the second account.

The implementations of the present specification provide an account refilling device, including at least one memory and at least one processor, where the memory stores a program, and the processor is configured to perform the following steps: establishing a data channel to a specified carrier including an account identifier of a first account by using a near field communications technology; and writing refilling data of a second account into the specified carrier through the data channel, to refill the first account.

The implementations of the present specification provide an account refilling device, including at least one memory and at least one processor, where the memory stores a program, and the processor is configured to perform the following steps: receiving refilling data sent by a first terminal device when a data channel is established to the first terminal device by using a near field communications technology; and processing balance data of a first account based on the refilling data.

The implementations of the present specification provide a data synchronization device, including at least one memory and at least one processor, where the memory stores a program, and the processor is configured to perform the following steps: obtaining, through near field communication, an account identifier of a first account and first streaming data corresponding to the first account from a specified carrier; receiving an account identifier of a second account and second streaming data corresponding to the second account that are sent by a first terminal device; and determining synchronization data in a synchronization period based on the first streaming data and the second streaming data, and sending the synchronization data to the first terminal device, so that data corresponding to the second account is consistent with data corresponding to a primary account, where an association relationship is established between the primary account included in a server and each of the first account included in the specified carrier and the second account included in the first terminal device.

The implementations of the present specification provide a data synchronization device, including at least one memory and at least one processor, where the memory stores a program, and the processor is configured to perform the following steps: establishing a data channel to a specified carrier through near field communication; and synchronizing balance data corresponding to a second account to the specified carrier through the data channel, so that data corresponding to a first account included in the specified carrier is consistent with data corresponding to the second account.

The implementations of the present specification provide a data synchronization device, including at least one memory and at least one processor, where the memory stores a program, and the processor is configured to perform the following steps: establishing a data channel to a specified carrier through near field communication; obtaining, through the data channel, an account identifier of a first account and first streaming data corresponding to the first account that are included in the specified carrier; determining second streaming data corresponding to a second account associated with the first account; and performing data synchronization between the first account and the second account based on the first streaming data and the second streaming data.

At least one of the technical solutions used in the implementations of the present specification can achieve the following beneficial effects:

The second account is created for the first account included in the specified carrier in the terminal device, and the first account is refilled through near field communication by using the second account in the terminal device, to ensure data consistency between the first account and the second account. To be specific, assuming that the first account is an account included in the specified carrier and the second account is a virtual electronic account associated with the first account, a user can complete a transaction by using the first account or the second account. In addition, in the technical solutions provided in the implementations of the present application, data consistency between the two accounts can be ensured, thereby improving payment experience of the user.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings:

FIG. 4(*b*) is a schematic flowchart illustrating a data synchronization method, according to an implementation of the present application;

FIG. 6(*b*) is a schematic flowchart illustrating a data synchronization method, according to an implementation of the present application;

DESCRIPTION OF IMPLEMENTATIONS

Figure 1:
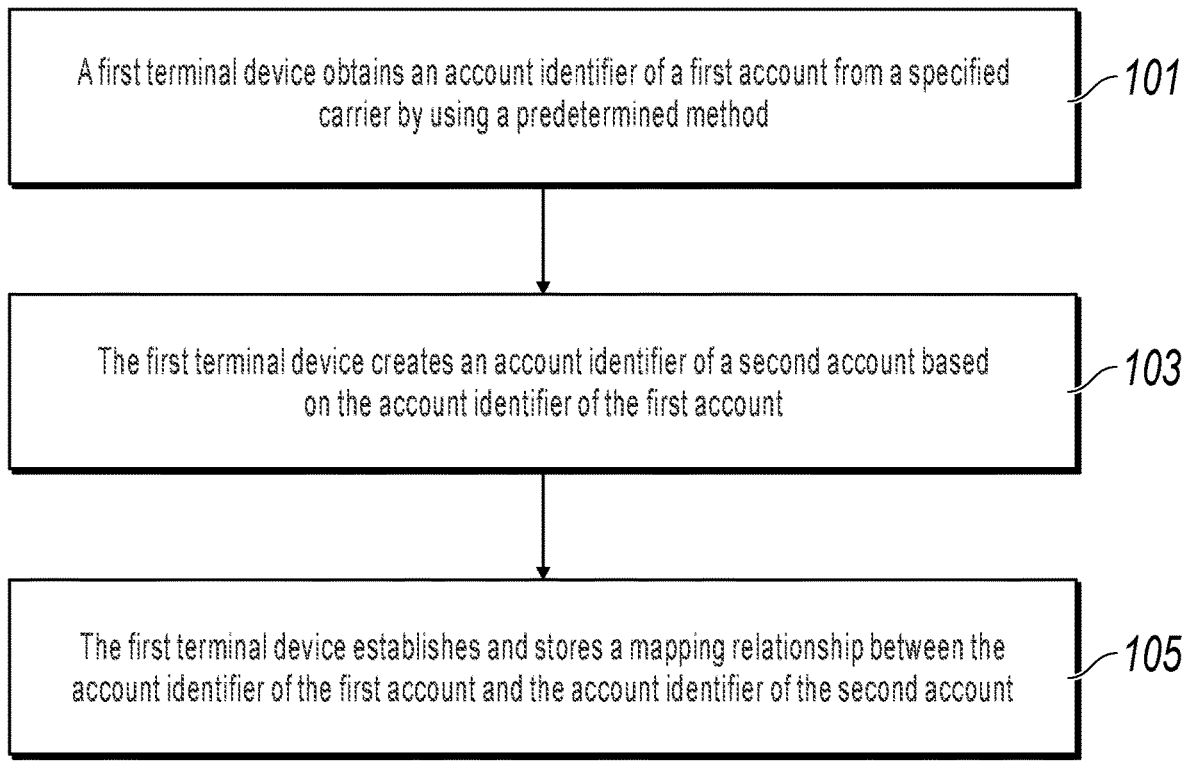
FIG. 1 is a schematic flowchart illustrating an account creation method, according to an implementation of the present application.

In the existing technology, using a mobile payment solution can facilitate payment, but there are some inconveniences for users. For example, if the user does not carry a mobile device or the mobile device runs out of power, the user cannot use the mobile device for payment. Therefore, if card payment and mobile payment can complement each other, production and life of the user are convenient.

However, with development of the Internet technology, a new payment method appears, that is, electronic payment. Electronic payment is currency payment or fund flowing performed by parties (including users, manufacturers, and financial institutions) engaged in an electronic commerce transaction through the information network by using a digitalized method and secure information transmission means. Compared with cash payment and earmarking payment, electronic payment can bring more convenience to users.

To achieve the objective, the implementations of the present application provide a method and device for account creation, account refilling and data synchronization. A second account is created for a first account included in a specified carrier in a terminal device, and the first account is refilled through near field communication by using the second account in the terminal device, to ensure data consistency between the first account and the second account. To be specific, assuming that the first account is an account included in the specified carrier and the second account is a virtual electronic account associated with the first account, a user can complete a transaction by using the first account or the second account. In addition, in the technical solutions provided in the implementations of the present application, data consistency between the two accounts can be ensured, thereby improving payment experience of the user.

It is worthwhile to note that the technical solutions described in the implementations of the present application can be applied to a public transportation scenario or another application scenario related to an application (APP) similar to an IC card. Implementations are not specifically limited here.

An integrated circuit card (IC card) can also be referred to as a smart card. This card is readable and writable, has a large capacity, an encryption function, and a reliable data record, and is easy to use. In an example of a bus card, a user can pay for the transportation fee by using the bus car when taking a public transportation. When the bus card exchanges data with a card swiping machine of the public transportation tool, the card swiping machine reads a value in the bus card and deducts the transportation fee. In addition, currently, the bus card is usually refilled by using an earmarking method, that is, the user needs to go to a specified refilling station to refill the bus card.

To make the objectives, technical solutions, and advantages of the implementations of the present application clearer, the following clearly and describes the technical solutions of the present specification with reference to specific implementations and corresponding accompanying drawings of the present application. Apparently, the described implementations are merely some but not all of the implementations of the present specification. All other implementations obtained by a person of ordinary skill in the art based on the implementations of the present application without creative efforts shall fall within the protection scope of the present disclosure.

The technical solutions provided in the implementations of the present specification are described in detail below with reference to the accompanying drawings.

FIG. 1 is a schematic flowchart illustrating an account creation method, according to an implementation of the present application. The method can be shown below. This implementation of the present application is performed by a terminal device.

Step 101: A first terminal device obtains an account identifier of a first account from a specified carrier by using a predetermined method.

In this implementation of the present application, that a first terminal device obtains an account identifier of a first account from a specified carrier by using a predetermined method includes the following:

Method 1:

The first terminal device establishes a data channel to the specified carrier by using a near field communications technology, and obtains the account identifier of the first account from the specified carrier through the data channel.

Method 2:

The first terminal device obtains the account identifier of the first account from the specified carrier through scanning.

The specified carrier described here includes at least one of a card apparatus supporting a near field communications technology, a second terminal device including the account identifier of the first account, or an application client including the account identifier of the first account.

Step 103: The first terminal device creates an account identifier of a second account based on the account identifier of the first account.

In this implementation of the present application, after obtaining the account identifier of the first account, the first terminal device can create the account identifier of the second account based on account identifier of the first account, or can separately create the account identifier of the second account. Implementations are not specifically limited here.

The second account described here includes one of a virtual account and an electronic account.

Step 105: The first terminal device establishes and stores a mapping relationship between the account identifier of the first account and the account identifier of the second account.

In this implementation of the present application, the method further includes the following:

The first terminal device establishes and stores an association relationship between the account identifier of the second account and an application account used for payment after obtaining the account identifier of the second account.

Figure 2:
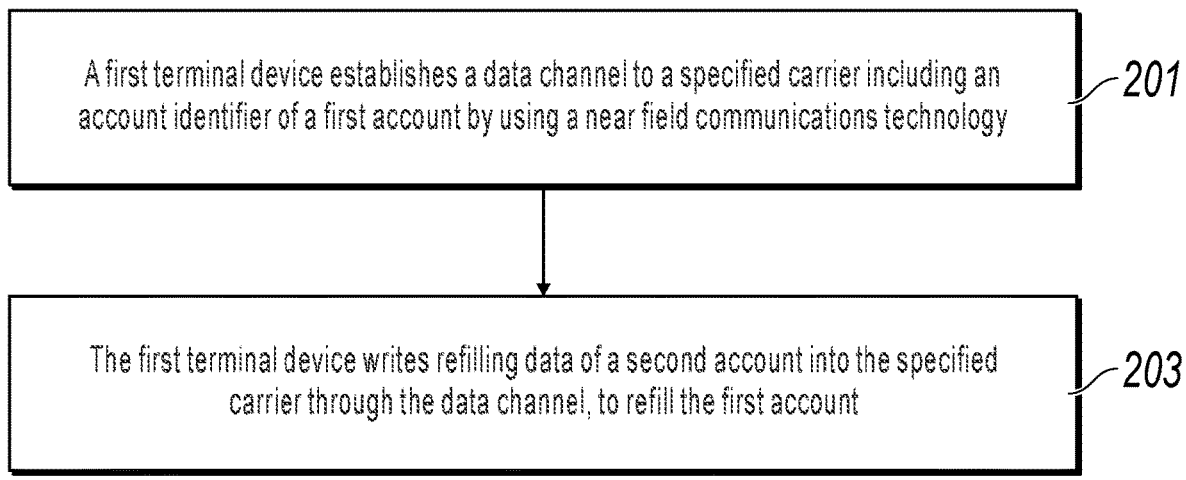
FIG. 2 is a schematic flowchart illustrating an account refilling method, according to an implementation of the present application.

FIG. 2 is a schematic flowchart illustrating an account refilling method, according to an implementation of the present application. The method can be shown below. This implementation of the present application can be performed by an intelligent terminal device, for example, a mobile device.

Step 201: A first terminal device establishes a data channel to a specified carrier including an account identifier of a first account by using a near field communications technology.

In this implementation of the present application, before the data channel is established, the method further includes the following:

The first terminal device performs a transfer operation for a second account by using an application account used for payment, to generate refilling data of the second account.

The specified carrier described here includes at least one of a card apparatus supporting a near field communications technology, a second terminal device including the account identifier of the first account, or an application client including the account identifier of the first account.

Step 203: The first terminal device writes the refilling data of the second account into the specified carrier through the data channel, to refill the first account.

Figure 3:
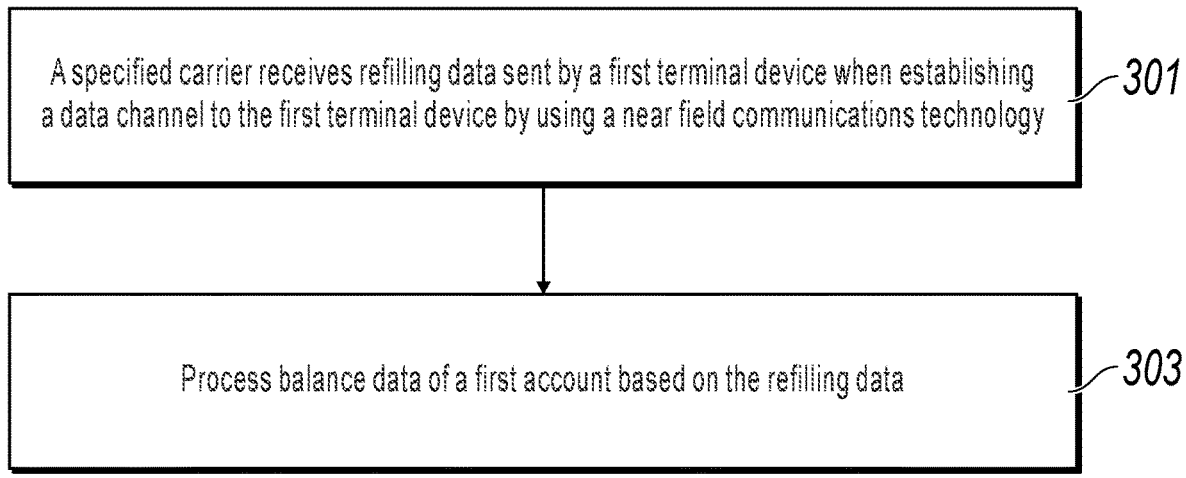
FIG. 3 is a schematic flowchart illustrating an account refilling method, according to an implementation of the present application.

FIG. 3 is a schematic flowchart illustrating an account refilling method, according to an implementation of the present application. The method can be shown below. This implementation of the present application can be performed by a specified carrier, for example, an IC card or a terminal device.

Step 301: A specified carrier receives refilling data sent by a first terminal device when establishing a data channel to the first terminal device by using a near field communications technology.

Step 303: Process balance data of a first account based on the refilling data.

In this implementation of the present application, the refilling data is written into the first account when the balance data of the first account is zero; or the balance data of the first account is modified by using the refilling data when the balance data of the first account is not zero.

In the solutions described in FIG. 2 and FIG. 3 in the implementations of the present application, a used card apparatus of an IC card type can be refilled by using a mobile device (for example, a smartphone), so as to effectively avoid various inconveniences (for example, a user needs to wait for a relatively long time or needs to go to a place where a refilling device is located) caused to actual lives because of the fixed refilling device, thereby effectively improving refilling efficiency, and bring very good user experience.

Figure 4A:
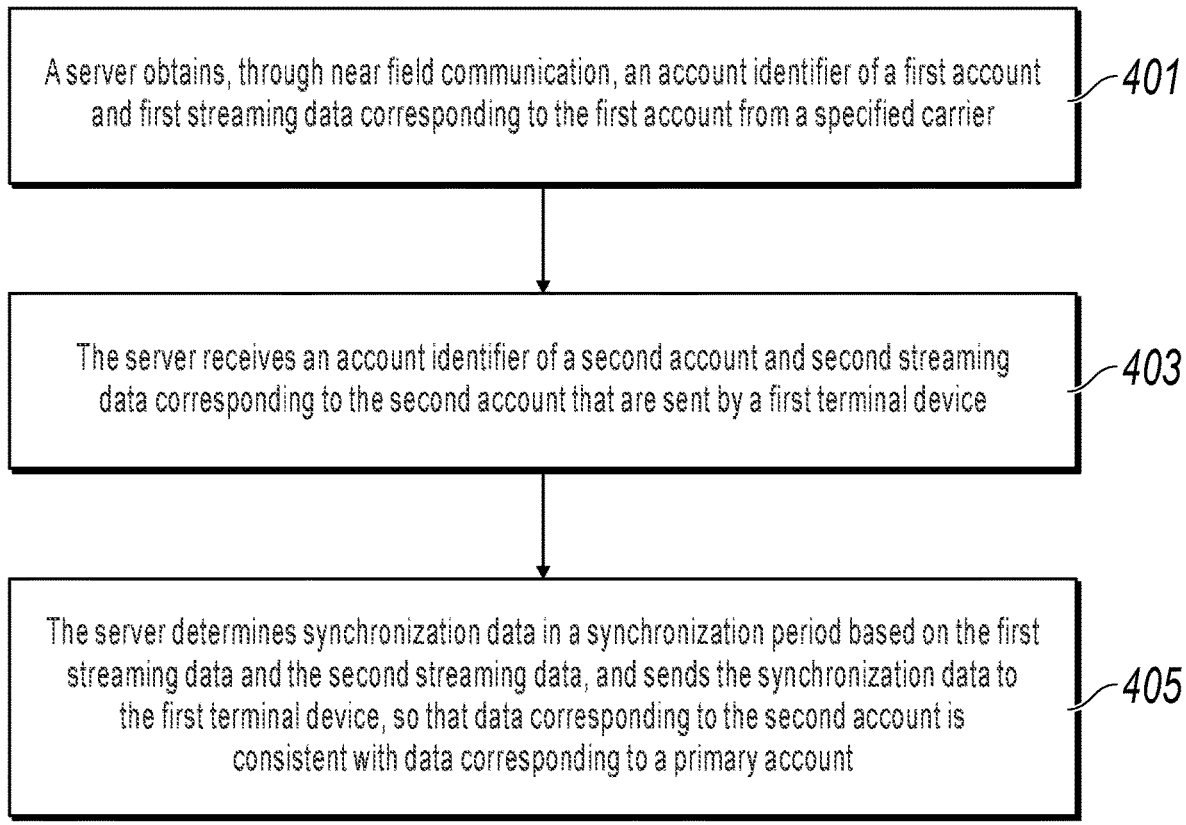
FIG. 4(*a*) is a schematic flowchart illustrating a data synchronization method, according to an implementation of the present application.

FIG. 4(a) is a schematic flowchart illustrating a data synchronization method, according to an implementation of the present application. The method can be shown below. This implementation of the present application is performed by a server. An association relationship is established between a primary account included in the server and each of a first account included in a specified carrier and a second account included in a first terminal device.

It is assumed that the server here is a public transportation server, and the public transportation server can establish a primary account for a user based on an identity of the user. In this case, when the user applies for a bus card, the public transportation server can establish a mapping relationship between the primary account and a card identifier of the bus card (that is, an account identifier of the first account). In addition, assuming that the user creates a virtual electronic card associated with a card number of the bus card in a terminal device, the user can further establish a mapping relationship between the primary account and a card identifier of the virtual electronic card (that is, an account identifier of the second account).

Step 401: The server obtains, through near field communication, the account identifier of the first account and first streaming data corresponding to the first account from the specified carrier.

In this implementation of the present application, the server establishes a data channel to the specified carrier through near field communication.

The server obtains, through the data channel, the account identifier of the first account and the first streaming data corresponding to the first account from the specified carrier when it is determined that a transaction occurs.

For example, when the user swipe the bus card for consumption, consumption data of the bus card can be sent to the server by using a POS machine or a card swiping machine provided by a merchant. As such, the server can obtain in time the account identifier of the first account and the first streaming data corresponding to the first account that are included in the bus card.

Step 403: The server receives the account identifier of the second account and second streaming data corresponding to the second account that are sent by the first terminal device.

Step 405: The server determines synchronization data in a synchronization period based on the first streaming data and the second streaming data, and sends the synchronization data to the first terminal device, so that data corresponding to the second account is consistent with data corresponding to the primary account.

In this implementation of the present application, the method further includes: sending a deduction request to the first terminal device if the synchronization data is a negative number, where the deduction request is used to request to deduct an amount corresponding to the negative number from an application account associated with the second account and used for payment.

Figure 4B:
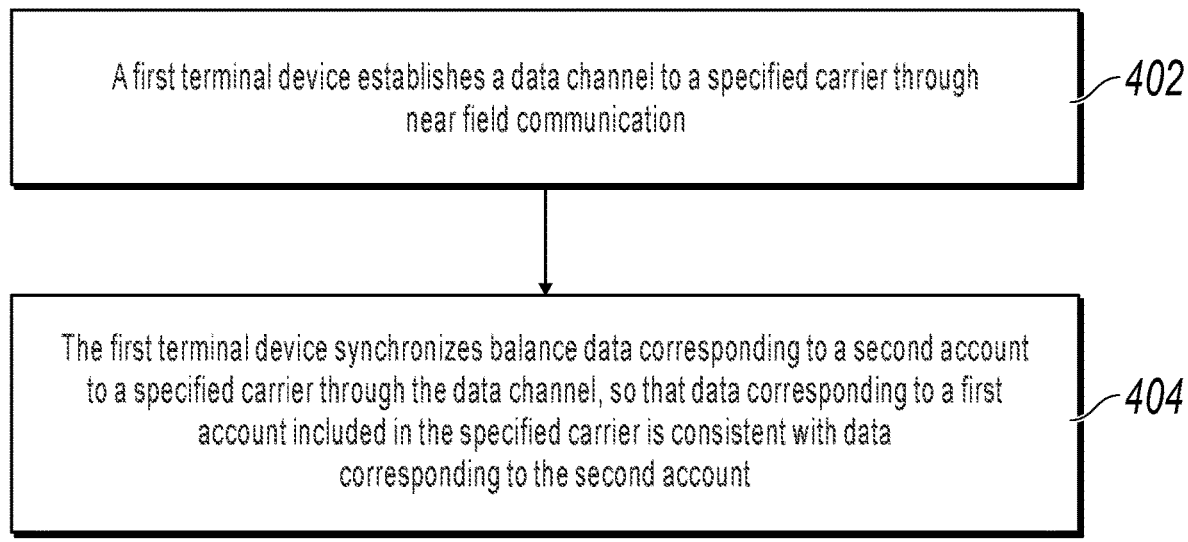

FIG. 4(b) is a schematic flowchart illustrating a data synchronization method, according to an implementation of the present application. The method can be shown below. This implementation of the present application is performed by a terminal device.

Step 402: A first terminal device establishes a data channel to a specified carrier through near field communication.

Step 404: The first terminal device synchronizes balance data corresponding to a second account to the specified carrier through the data channel, so that data corresponding to a first account included in the specified carrier is consistent with data corresponding to the second account.

In this implementation of the present application, before the data channel is established, the method further includes the following:

The first terminal device receives synchronization data sent by a server. The synchronization data is obtained by the server in the method described in 4(a).

The first terminal device modifies the data corresponding to the second account by using the synchronization data, so that the data corresponding to the second account is consistent with data corresponding to a primary account included in the server.

An association relationship is established between the primary account included in the server and each of the first account included in the specified carrier and the second account included in the first terminal device.

Figure 5:
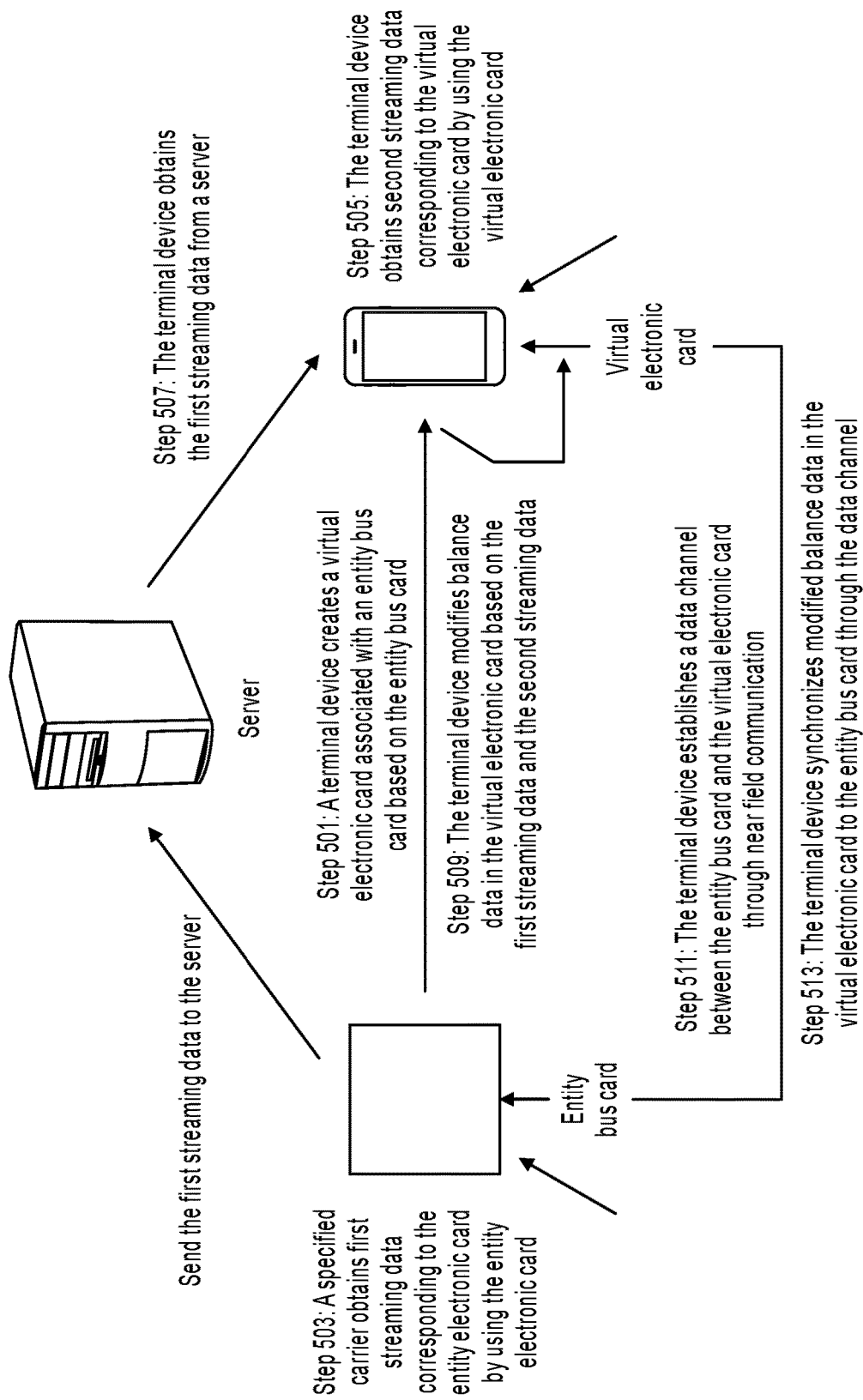
FIG. 5 is a schematic flowchart illustrating a data synchronization method, according to an implementation of the present application.

FIG. 5 is a schematic flowchart illustrating a data processing method, according to an implementation of the present application. The method can be shown below. This implementation of the present application is described by using a public transportation scenario as an example. Here, a first account corresponds to an account in an entity bus card, a second account corresponds to an account in a virtual electronic card, and an association relationship is established between the first account and the second account.

Refilling data and payment data of the entity bus card are written into the entity bus card, that is, the entity bus card has a data storage function, and can record generated streaming data in real time. Refilling data and payment data of the virtual electronic card are stored in a terminal device, so that the terminal device can record generated streaming data in real time.

Step 501: A terminal device creates a virtual electronic card associated with an entity bus card based on the entity bus card.

Step 503: A specified carrier obtains first streaming data corresponding to the entity bus card by using the entity bus card, and sends the first streaming data to a server.

Step 505: The terminal device obtains second streaming data corresponding to the virtual electronic card by using the virtual electronic card.

There is no strict execution sequence for performing step 503 and step 505. Step 503 and step 505 can be implemented synchronously performed, or can be implemented by using a method described in this implementation of the present application; or step 505 can be performed before step 503. Implementations are not specifically limited here.

Step 507: The terminal device obtains the first streaming data from the server.

Step 509: The terminal device modifies balance data in the virtual electronic card based on the first streaming data and the second streaming data.

Step 511: The terminal device establishes a data channel between the entity bus card and the virtual electronic card through near field communication.

Step 513: The terminal device synchronizes modified balance data in the virtual electronic card to the entity bus card through the data channel.

Figure 6A:
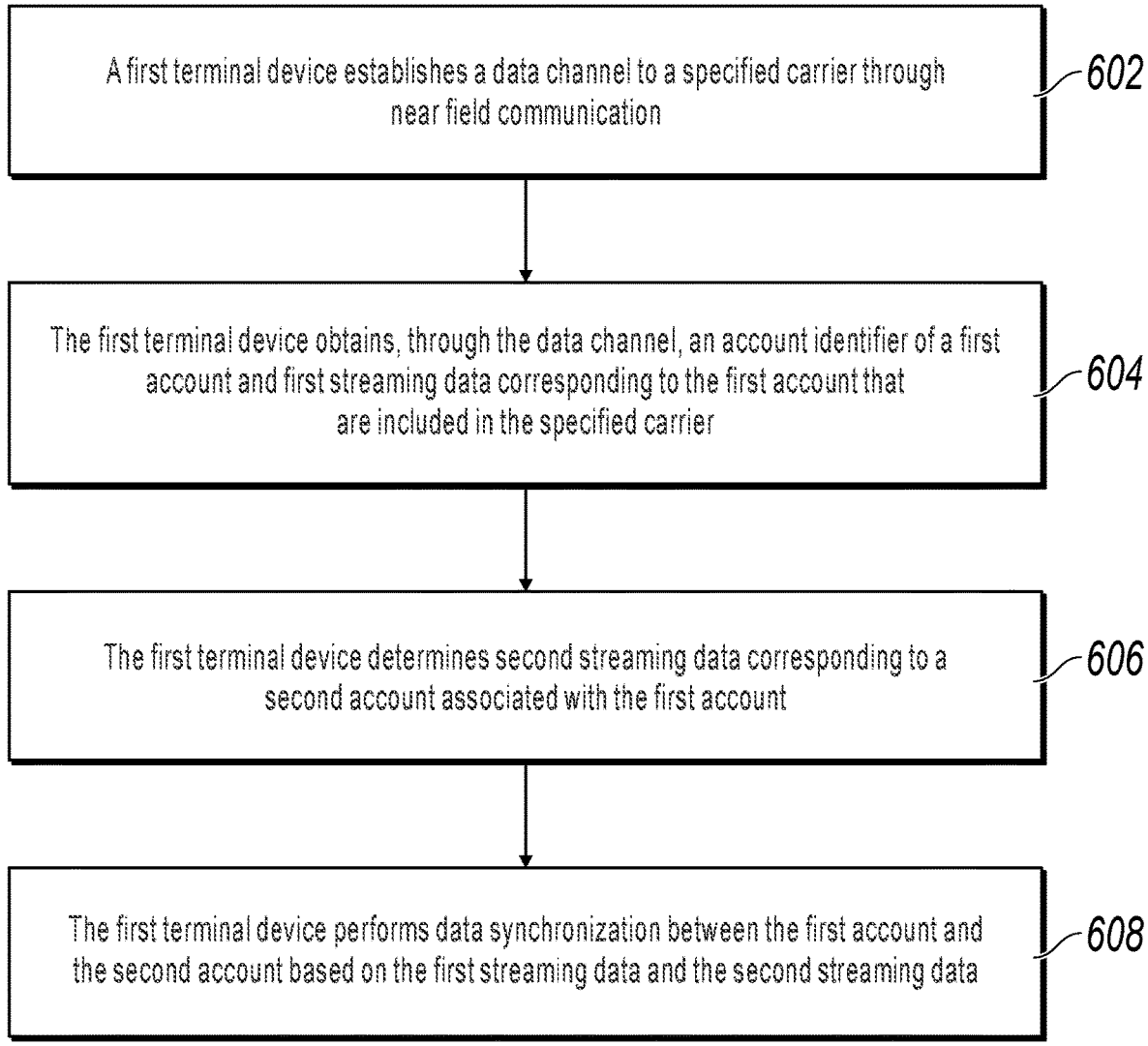
FIG. 6(*a*) is a schematic flowchart illustrating a data synchronization method, according to an implementation of the present application.

FIG. 6(a) is a schematic flowchart illustrating a data synchronization method, according to an implementation of the present application. The method can be shown below. This implementation of the present application is performed by a terminal device.

Step 602: A first terminal device establishes a data channel to a specified carrier through near field communication.

In this implementation of the present application, before the first terminal device establishes the data channel, the method further includes the following:

The first terminal device sends prompt information if it is detected that data corresponding to a second account associated with a first account changes, where the prompt information is used to prompt a user to perform data synchronization between the first account and the second account.

Step 604: The first terminal device obtains, through the data channel, an account identifier of the first account and first streaming data corresponding to the first account that are included in the specified carrier.

Step 606: The first terminal device determines second streaming data corresponding to the second account associated with the first account.

In this implementation of the present application, the first terminal device determines an account identifier of the second account based on the account identifier of the first account, where an association relationship is established between the account identifier of the second account and the account identifier of the first account.

The first terminal device searches the second streaming data based on the account identifier of the second account, where a corresponding relationship is established between the second streaming data and the account identifier of the second account.

Step 608: The first terminal device performs data synchronization between the first account and the second account based on the first streaming data and the second streaming data.

In this implementation of the present application, the first terminal device calculates synchronization data used for synchronization based on the first streaming data and the second streaming data.

The first terminal device separately synchronizes the synchronization data to the first account and the second account.

The first terminal device separately writes null into the first account and the second account if the synchronization data is a negative number; and deducts an amount corresponding to the negative number from an application account associated with the second account and used for payment.

In this implementation of the present application, the method further includes: sending a synchronization time, the account identifier of the first account, and the first streaming data to a server, and deleting the first streaming data recorded in the carrier including the first account; and/or sending a synchronization time, an account identifier of the second account, and the second streaming data to a server, and deleting the second streaming data.

In this implementation of the present application, the streaming data includes at least one of consumption data or refilling data.

Figure 6B:
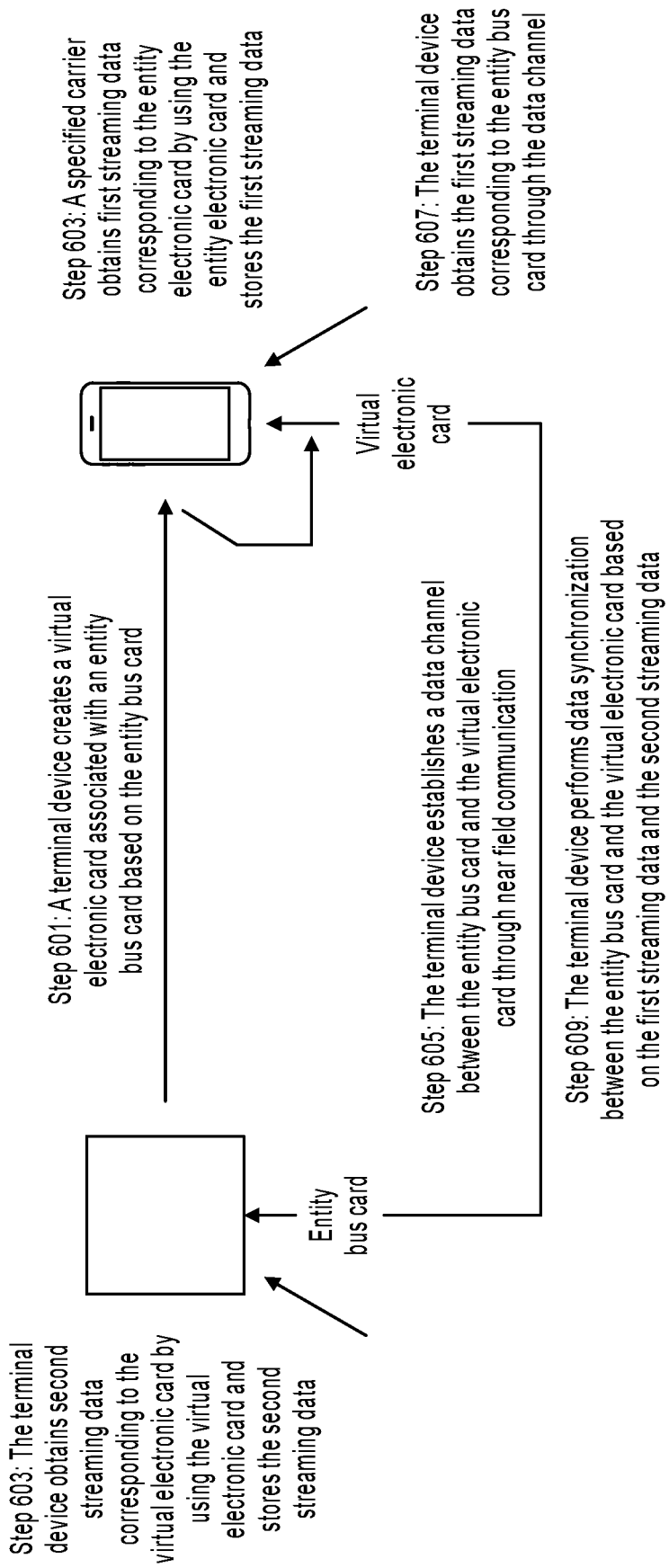

FIG. 6(b) is a schematic flowchart illustrating a data processing method, according to an implementation of the present application. The method can be shown below. This implementation of the present application is described by using a public transportation scenario as an example. Here, a first account corresponds to an account in an entity bus card, a second account corresponds to an account in a virtual electronic card, and an association relationship is established between the first account and the second account.

Refilling data and payment data of the entity bus card are written into the entity bus card, that is, the entity bus card has a data storage function, and can record generated streaming data in real time. Refilling data and payment data of the virtual electronic card are stored in a terminal device, so that the terminal device can record generated streaming data in real time.

Step 601: A terminal device creates a virtual electronic card associated with an entity bus card based on the entity bus card.

Step 603: A specified carrier obtains first streaming data corresponding to the entity bus card by using the entity bus card and stores the first streaming data; and the terminal device obtains second streaming data corresponding to the virtual electronic card by using the virtual electronic card and stores the second streaming data.

Step 605: The terminal device establishes a data channel between the entity bus card and the virtual electronic card through near field communication.

Step 607: The terminal device obtains the first streaming data corresponding to the entity bus card through the data channel.

Step 609: The terminal device performs data synchronization between the entity bus card and the virtual electronic card based on the first streaming data and the second streaming data.

A difference between the implementations shown in FIG. 5 and FIG. 6(b) lies in that when the streaming data of the entity bus card is generated, the streaming data is not only stored in the entity bus card, but also sent to the server corresponding to the entity bus card. When the streaming data of the virtual electronic card is generated, the streaming data is not only stored in the terminal device, but also sent to the server. The terminal device where the virtual electronic card is located can obtain the first streaming data of the entity bus card from the server, and the terminal device can modify data in the virtual electronic card based on the stored second streaming data and the obtained first streaming data, so as to ensure that modified data is consistent with the data in a primary account of the user in the server.

Figure 7:
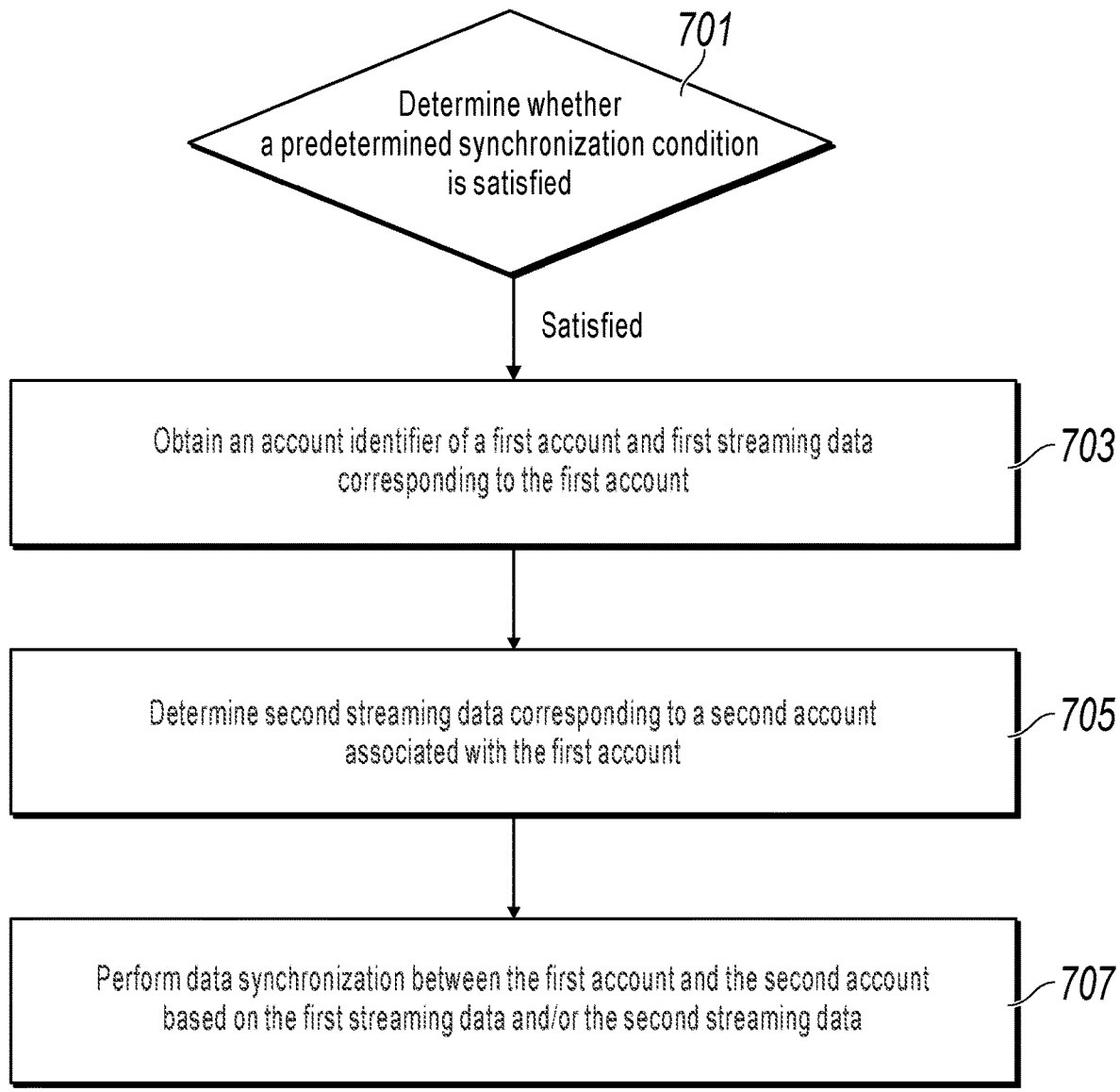
FIG. 7 is a schematic flowchart illustrating a data synchronization method, according to an implementation of the present application.

Based on the same inventive concept, FIG. 7 is a schematic flowchart illustrating a data synchronization method, according to an implementation of the present application. The method can be shown below. This implementation of the present application can be performed by a terminal device or an application client having the technical solution provided in this implementation of the present application. Implementations are not specifically limited.

Step 701: Determine whether a predetermined synchronization condition is satisfied, and perform step 703 if the synchronization condition is satisfied; otherwise, wait for a predetermined time to continue to perform step 701.

In this implementation of the present application, the predetermined synchronization condition can include but is not limited to the following conditions:

1. Whether a carrier including a first account is detected. If the carrier including the first account is detected, it indicates that the predetermined synchronization condition is satisfied; or if the carrier including the first account has not been detected, it indicates that the predetermined synchronization condition is not satisfied.

2. Whether a data synchronization request is received. If the data synchronization request is received, it is further determined whether the carrier including the first account is detected. If the carrier including the first account is detected, it indicates that the predetermined synchronization condition is satisfied; or prompt information is sent if the carrier including the first account has not been detected. The prompt information is used to remind a user to provide the carrier including the first account and establish a data channel. Alternatively, if the data synchronization request has not been received, it indicates that the predetermined synchronization condition is not satisfied.

3. Whether a predetermined synchronization period ends. If the predetermined synchronization period ends, it is further determined whether the carrier including the first account is detected. If the carrier including the first account is detected, it indicates that the predetermined synchronization condition is satisfied; or prompt information is sent if the carrier including the first account has not been detected. The prompt information is used to remind a user to provide the carrier including the first account and establish a data channel. Alternatively, if the predetermined synchronization period has not ended, it indicates that the predetermined synchronization period is not satisfied.

One of the synchronization conditions enumerated in this implementation of the present application can be selected for use, or several of the synchronization conditions can be selected for mixed use. In addition, the predetermined synchronization condition is not limited to the synchronization conditions enumerated in this implementation of the present application, and can be further determined based on an actual requirement. Implementations are not specifically limited here.

Preferably, in this implementation of the present application, when the carrier including the first account is detected, it can be further determined whether a second account associated with an account identifier of the first account exists. If the second account does not exist, the second account associated with the first account is first created based on the account identifier of the first account, and then a data synchronization operation is triggered. Alternatively, if the second account exists, the following operations are performed based on solution described in this implementation of the present application.

It is worthwhile to note that the carrier including the first account described in this implementation of the present application can be a card (for example, an IC card) supporting near field communication. Near field communication here includes but is not limited to Bluetooth, infrared, NFC, RFID, etc. Implementations are not specifically limited here.

Step 703: Obtain the account identifier of the first account and first streaming data corresponding to the first account.

In this implementation of the present application, methods for obtaining the account identifier of the first account and the first streaming data corresponding to the first account include but are not limited to the following three methods.

Method 1:

A data channel is established to the carrier including the first account through near field communication; and the account identifier of the first account and the first streaming data corresponding to the first account are obtained from the carrier through the data channel.

Assuming that the carrier including the first account is a card supporting NFC, a terminal device can establish a data channel to the card through NFC, and can obtain the account identifier of the first account (for example, a card number of the card) and the first streaming data corresponding to the first account from the card through the data channel.

It is worthwhile to note that when exchanging data with another device, the card can record generated streaming data, such as consumption data and refilling data, and record a time when the streaming data is generated.

Method 2:

The account identifier of the first account is obtained from the carrier including the first account through scanning; and the first streaming data corresponding to the account identifier of the first account is obtained from a server based on the account identifier of the first account.

For example, the carrier including the first account includes a two-dimensional code picture, and the two-dimensional code picture includes the account identifier of the first account. In this case, the account identifier of the first account can be obtained from the carrier through scanning, and then the streaming data corresponding to the account identifier of the first account is found by using the account identifier of the first account.

Method 3:

A user interface is provided, and the account identifier of the first account is entered by a user is received by using the user interface; and the first streaming data corresponding to the account identifier of the first account is obtained from a server based on the account identifier of the first account.

For example, a user interface is provided in a terminal device, and a data synchronization operation can be initiated by using the user interface. To be specific, the account identifier of the first account can be obtained by using the user interface, and the account identifier of the first account here can be understood as a card number of a card including the first account. Then the streaming data corresponding to the account identifier of the first account can be obtained by using the account identifier of the first account.

Preferably, before the account identifier of the first account and the first streaming data corresponding to the first account are obtained, the method further includes: sending prompt information if it is detected that data of the second account associated with the first account changes, where the prompt information is used to prompt a user to perform data synchronization between the first account and the second account.

For example, to ensure data consistency between the first account and the second account associated with the first account, the prompt information can be sent to the user when it is detected that the data of the second account associated with the first account changes, to prompt the user to perform data synchronization between the first account and the second account.

Preferably, in this implementation of the present application, the first streaming data generated by the first account in a synchronization period is obtained.

The synchronization period here can be understood as a time when two consecutive synchronization operations occur. The synchronization period here can be a fixed period or an unfixed period. Implementations are not specifically limited here. For example, when a current synchronization operation is initiated, a time T when a previous synchronization operation is initiated or previous data synchronization is completed is determined. In this case, the determined time T is used as a start point and a time when the current synchronization operation is initiated is used as an end point, and streaming data generated in the time period (from the start point to the end point) is determined.

Step 705: Determine second streaming data corresponding to the second account associated with the first account.

In this implementation of the present application, an account identifier of the second account is determined based on the account identifier of the first account, where an association relationship is established the account identifier of the second account and the account identifier of the first account.

The second streaming data is searched based on the account identifier of the second account, where a corresponding relationship is established between the second streaming data and the account identifier of the second account.

How to establish the second account associated with the first account is described below in detail.

First, the account identifier of the first account is obtained.

A method for obtaining the account identifier of the first account here includes but is not limited to: obtaining the account identifier of the first account from the carrier including the first account through near field communication; obtaining the account identifier of the first account from the carrier including the first account through scanning; or receiving, by using the user interface, the account identifier of the first account entered by the user by using the user interface.

Then the account identifier of the second account is created based on the account identifier of the first account.

The account identifier of the second account created here can be the same as or different from the account identifier of the first account. Implementations are not specifically limited here.

Finally, the association relationship between the account identifier of the first account and the account identifier of the second account is established and stored.

It is worthwhile to note that at least one second account can be created for the first account. When data synchronization is performed, data synchronization between a virtual account and an entity account can be performed. To be specific, the first account and the second account described in this implementation of the present application respectively represent the entity account and the virtual account, and there is an association relationship between the entity account and the virtual account. A quantity of virtual accounts is not limited here.

Preferably, to prevent the user from maliciously using the virtual account, the method further includes: establishing and storing an association relationship between the account identifier of the second account and an application account used for payment after the account identifier of the second account is obtained.

To be specific, when the virtual account (that is, the second account) is created, a withholding protocol is signed with the user, that is, the association relationship between the account identifier of the second account and the application account used for payment is established. Once a malicious overdraft is discovered in the second account or a malicious overdraft is discovered after data synchronization is implemented between the first account and the second account, the malicious overdraft fee can be deducted from the application account used for payment, where the association relationship is established between the application account used for payment and the account identifier of the second account.

It is worthwhile to note that "first" and "second" in the "first account" and the "second account" described in this implementation of the present application have no special meanings, and are merely used to distinguish between accounts. Further, the carrier including the first account is entitative, for example, an IC card, but a carrier including the second account is virtual, for example, an electronic card.

Step 707: Perform data synchronization between the first account and the second account based on the first streaming data and/or the second streaming data.

In this implementation of the present application, synchronization data used for synchronization is calculated based on the first streaming data and/or the second streaming data; and the synchronization data is separately synchronized to the first account and the second account.

It is assumed that when the second account is created, balance data corresponding to the first account is synchronized to the second account based on the balance data.

If the synchronization data is a negative number, null is separately written into the first account and the second account; or an amount corresponding to the negative number is deducted from the application account associated with the second account and used for payment.

Preferably, the method further includes: sending a synchronization time, the account identifier of the first account, and the first streaming data to a server, and deleting the first streaming data recorded in the carrier including the first account; and/or sending a synchronization time, an account identifier of the second account, and the second streaming data to a server, and deleting the second streaming data.

The streaming data described in this implementation of the present application includes at least one of consumption data or refilling data.

In the technical solution provided in this implementation of the present application, when the predetermined condition is satisfied, the account identifier of the first account and the first streaming data corresponding to the first account are obtained, the second streaming data corresponding to the second account associated with the first account is determined, data synchronization is performed between the first account and the second account based on the first streaming data and/or the second streaming data. As such, data consistency between the first account and the second account can be effectively ensured. To be specific, assuming that the first account is an account included in the carrier and the second account is a virtual electronic account associated with the first account, a user can complete a transaction by using the first account or the second account. In addition, in the technical solution provided in this implementation of the present application, data consistency between the two accounts can be ensured, thereby improving payment experience of the user.

Figure 8:
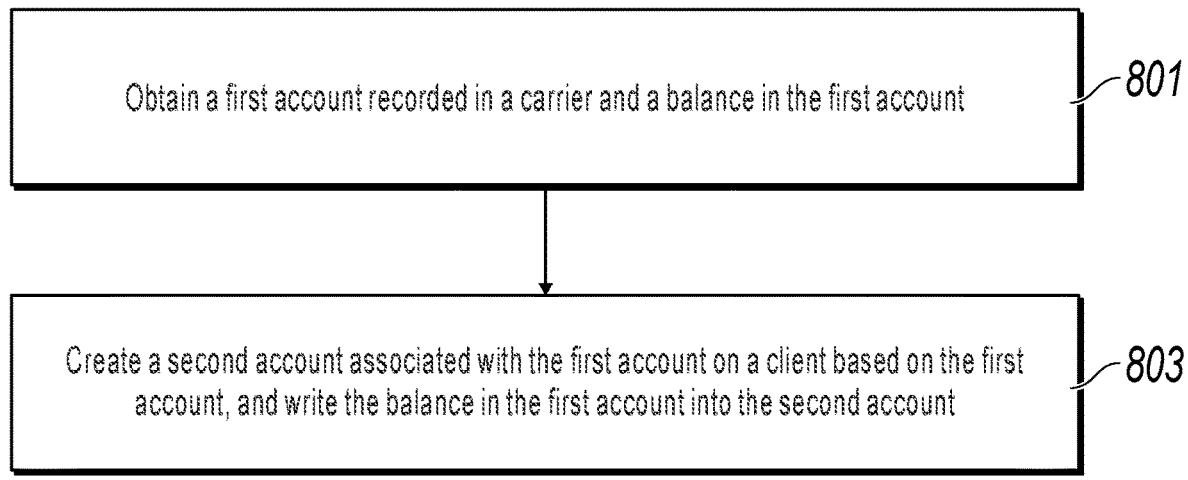
FIG. 8 is a schematic flowchart illustrating a data synchronization method, according to an implementation of the present application.

FIG. 8 is a schematic flowchart illustrating a data synchronization method, according to an implementation of the present application. This implementation of the present application can be executed by a client, and the client can be an APP running in an intelligent terminal. The intelligent terminal includes but is not limited to a mobile intelligent terminal, such as a smartphone or a tablet computer, and further includes another intelligent terminal such as a computer or a notebook.

Step 801: Obtain a first account recorded in a carrier and a balance in the first account.

In this implementation of the present application, the first account can be provided by a body issued the carrier, and is written into the carrier. Forms of the first account can include numbers, letters, and a combination thereof. Implementations are not specifically limited here. Forms of the carrier can include but are limited to an entity card, a button card, etc. Implementations are not specifically limited here.

In this implementation of the present application, a number in the carrier can be read to form a balance in the first account. For example, the carrier includes a near field communication (NFC) module. A terminal device supporting an NFC function can write a number into the NFC module when a transaction occurs, and can read the number in the NFC module.

This implementation of the present application can provide but is not limited to the following implementations:

1. A radio frequency signal is sent to the carrier, so that the carrier sends a response signal based on the radio frequency signal. The response signal is received, and the first account and the balance in the first account are parsed from the response signal.

In this implementation of the present application, when a user performs data collection/payment by using the first account in the carrier or a second account in the client, the user can put the carrier close to a device where the client is located. That the client sends the radio frequency signal to the carrier by using the NFC module is sending a near field radio frequency signal to the carrier. The NFC module in the carrier generates the response signal to respond to the radio frequency signal, and the response signal includes the first account and the balance in the first account. The client receives the response signal by using the NFC module, and parsing out the first account and the balance in the first account by using a parsing module.

If the carrier includes a response module that can receive and respond to a radio frequency signal at another frequency, the device where the client is located is operated to send the radio frequency signal at another frequency that can be responded to. Therefore, if the radio frequency signal sent by the device where the client is located can be responded by the carrier, the radio frequency signal sent by the client includes but is not limited to a near field radio frequency signal. Implementations are not specifically limited here.

2. The first account entered by a user is received, and the balance in the first account is obtained from a server based on the first account.

In this implementation of the present application, after a collection/payment device that performs data collection/ payment with the client writes the latest balance into the first account, the device can further store the balance in the first account in the server. In this way, the client can search the server by using the first account entered by the user for the latest balance in the first account.

3. The carrier is scanned to obtain the first account, and the balance in the first account is obtained from a server based on the first account.

In this implementation of the present application, if the first account is displayed on a carrier surface, the client can scan the carrier surface to obtain the first account. In this case, the first account can exist but not only exist in the following form: the first account is highlighted, so that the client obtains the first account through pattern identification; or the first account is recorded in an identification code such as a two-dimensional code or a barcode, so that the client scans and parses the identification code to obtain the first account.

For a method for obtaining the balance in the first account from the server, refer to the second method for obtaining the balance in the first account. Details are omitted here for simplicity.

Step 803: Create the second account associated with the first account in the client based on the first account, and write the balance in the first account into the second account.

In this implementation of the present application, if the first account is considered as an entity account recorded in the carrier, the second account can be a virtual account associated with the entity account. The virtual account can be stored in the client in a form of a user graphical interface, and the user graphical interface can display the virtual account and a balance in the virtual account. The user graphical interface provides interface objects, and the interface objects can be operated to process a collection/payment service. For example, the interface objects include a two-dimensional code generation object. The two-dimensional code generation object can be clicked to generate a payment two-dimensional code. The payment two-dimensional code is used for the collection/payment.

In this implementation of the present application, after the second account is created in the client, the client can send the balances in second account and the first account to the server. In addition, after collection/payment data subsequently generated in the second account, the client can send the collection/payment data to the server for storage, to avoid increasing storage burden of the client. Moreover, during subsequent balance synchronization between the first account and the second account, the client can conveniently obtain the collection/payment data generated in the second account and the balance from the server.

In this implementation of the present application, that the second account associated with the first account is created in the client based on the first account can include but is not limited to the following:

A second account the same as the first account is created in the client, and the second account the same as the first account is determined as the second account associated with the first account. In this case, identification information of the first account is the same as the second account, for example, the two pieces of identification information have the same letter, the same number, or the same combination thereof.

The second account and the first account can be different, and an association relationship between the second account and the first account is formed based on an association rule.

In the account processing method provided in this implementation of the present application, the user can create the second account associated with the first account at any time, so that the user can perform data collection/payment by using the first account in the carrier or by using the second account in the client. Particularly, even if one of the carrier and the client is not took or cannot be used during consumption, the other one of the carrier and the client can be used for consumption payment, thereby improving user payment experience.

Figure 9:
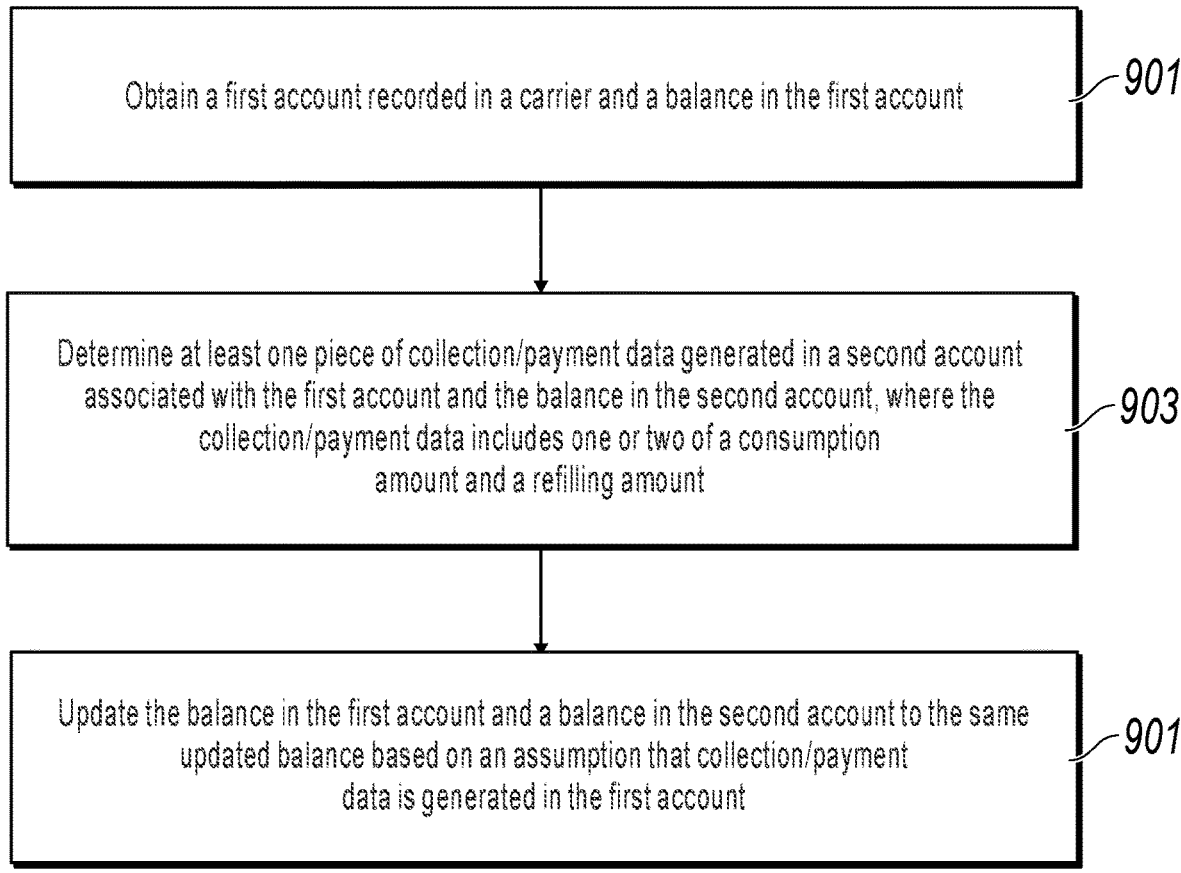
FIG. 9 is a schematic flowchart illustrating a data synchronization method, according to an implementation of the present application.

FIG. 9 is a schematic flowchart of a data synchronization method according to an implementation of the present application. The method is shown below, and is intended to implement balance synchronization between a first account and a second account associated with the first account. The account processing method can be executed by a client, and the client can be an APP running in an intelligent terminal. The intelligent terminal includes but is not limited to a mobile intelligent terminal, such as a smartphone or a tablet computer, and further includes another intelligent terminal such as a computer or a notebook.

Step 901: Obtain a first account recorded in a carrier and a balance in the first account.

For a method for obtaining the first account recorded in the carrier and the balance in the first account, refer to content of step 801. Details are omitted here for simplicity.

In this implementation of the present application, to enable a user to synchronize in time collection/payment data generated in a second account to the first account after the collection/payment data is generated in the second account, before the first account recorded in the carrier and the balance in the first account are obtained, the processing method further includes the following:

A reminding signal is sent if at least one piece of collection/payment data is generated in the second account, and the reminding signal is used to remind the user to provide the first account associated with the second account, which bring convenience to the user and reduce memory burden of the user.

After receiving the reminding signal, the user can provide the first account and the balance in the first account to a client in the three obtaining methods described in step 801.

In this implementation of the present application, forms of the reminding signal can include but are not limited to a voice, a sound, a vibration, a graph, a character, etc. Implementations are not specifically limited here.

In this implementation of the present application, the sending a reminding signal is sent if at least one piece of collection/payment data is generated in the second account can include one or more of the following: sending the reminding signal each time collection/payment data is generated; sending the reminding signal after a predetermined amount of collection/payment data is generated; periodically sending the reminding signal; and sending the reminding signal if a balance in the second account is 0 or balances are insufficient due to generation of collection/payment data.

Step 903: Determine at least one piece of collection/payment data generated in the second account associated with the first account and the balance in the second account, where the collection/payment data includes one or two of a consumption amount and a refilling amount.

In this implementation of the present application, the determining at least one piece of collection/payment data generated in the second account associated with the first account and the balance in the second account includes: determining the second account associated with the first account; and determining at least one piece of collection/payment data generated in the second account and the balance in the second account.

In this implementation of the present application, a method for determining the second account associated with the first account can include: after the first account recorded in the carrier and the balance in the first account are obtained, determining a second account in all second accounts that runs on the client and is the same as the first account as the second account associated with the first account.

A method for determining the second account associated with the first account can include: sending the first account to a server, so that the server determines a second account the same as the first account; and determining the second account obtained from the server and the same as the first account as the second account associated with the first account.

A method for determining the second account associated with the first account can include: if the second account created based on step 803 is different from the first account, locally obtaining the second account associated with the first account or obtaining the second account associated with the first account from a server based on an association relationship between the first account and the second account.

In this implementation of the present application, a connection relationship between the client storing the second account and the background server can be established at any time. Therefore, the determining at least one piece of collection/payment data generated in the second account and the balance in the second account can include: sending a collection/payment data acquisition request to the server by using the client, where the collection/payment data acquisition request is used to request the server to send each piece of collection/payment data generated in the second account and the balance in the second account; and receiving each piece of collection/payment data generated in the second account and the balance in the second account that are sent by the server.

In this case, each piece of collection/payment data occurring in the second account is stored in the server, which can save storage burden of the local client.

In this implementation of the present application, the determining at least one piece of collection/payment data generated in the second account includes the following two cases:

1. At least one piece of collection/payment data generated in the second account in an adjacent update period is determined. The update period is a time interval that the balances in the first account and the second account are updated to the same updated balance consecutive two times. In this case, the collection/payment data acquisition request sent to the server is used to request the server to send each piece of collection/payment data generated in the adjacent update periods and the latest balance in the second account. Based on the collection/payment data acquisition request, the server sends, to the client, each piece of collection/payment data generated from the latest amount update to a current adjacent update period.

2. Collection/payment data generated in the second account in real time is determined. Referring to step 501, the balance in the first account is obtained each time the collection/payment data is generated in the second account.

Step 905: Update the balance in the first account and the balance in the second account to the same updated balance based on an assumption that collection/payment data is generated in the first account.

Based on step 903, if the determined collection/payment data generated in the second account is at least one piece of collection/payment data generated in the adjacent update period, the updating the balance in the first account and the balance in the second account to the same updated balance based on an assumption that collection/payment data is generated in the first account includes: updating the balance in the first account and the balance in the second account to the same updated balance based on the assumption that collection/payment data is generated in the first account in the adjacent update period.

Because there is consistency between the first account and the second account, generation of the collection/payment data in the second account can be equivalent to generation of the collection/payment data in the first account. Therefore, the same updated balance can be determined by setting an assumption that the collection/payment data is generated in the first account in the adjacent update period.

For example, reference can be made to Table 1:

TABLE 1

|  | First Account | Second Account |
| --- | --- | --- |
| Latest updated balance | 20 yuan | 20 yuan |
| Consumption amount | 3 yuan | 14 yuan |
| Refilling amount |  | 10 yuan |
| Current balance | 17 yuan | 16 yuan |
| Updated balance | 13 yuan | 13 yuan |

In the adjacent update period from the latest update to the current update, the collection/payment data generated in the second account includes the refilling amount of 10 yuan, and the consumption amount of 14 yuan. The current balance in the second account is 16 yuan, and the current balance in the first account is 17 yuan.

From a perspective of consistency between the first account and the second account, the updating the balance in the first account and the balance in the second account to the same updated balance based on an assumption that collection/payment data is generated in the first account includes: based on the assumption condition that the collection/payment data is generated in the first account, calculating an updated balance in the first account after the collection/payment data is generated; and updating the balance in the first account and the balance in the second account to the updated balance.

Based on different types of collection/payment data, the calculating an updated balance in the balance in the first account after the collection/payment data is generated includes: adding each refilling amount to the balance in the first account if the collection/payment data includes at least one refilling amount; or subtracting each consumption amount from the first account if the collection/payment data includes at least one consumption amount; and using an obtained processing result as the updated balance.

For example, referring to Table 1, assuming that the collection/payment data generated in the second account is generated in the first account, a current balance in the first account is calculated as 17−14+10=13 yuan, and it is determined that the updated balance is 13 yuan. The balances in the first and second accounts are then updated to 13 yuan.

The example of Table 1 is only for reference, and collection and collection/payment data generated in specific application scenarios have a plurality of other cases. Implementations are not specifically limited.

The method for determining at least one piece of collection/payment data generated in the second account is particularly applicable to a case that the carrier recording the first account cannot be connect to the server in real time or the client storing the second account is frequently used, and therefore a connection problem existing in the carrier where the first account is located can be solved.

As such, when the balances in the first account and the second account are updated synchronously each time, a plurality of pieces of collection/payment data can be processed simultaneously, and processing efficiency is more efficient.

If it is determined, based on step 903, that the collection/payment data generated in the second account is real-time collection/payment data, reference can be made to the example in Table 1 to determine the same update made to the first account and the second account. Details are omitted here for simplicity.

In this implementation of the present application, after the updated balance is determined, the client can directly update the balance in the second account to the updated balance.

Referring to the three methods for obtaining the balance in the first account recorded in the carrier in step 801, a method for updating the balance in the first account to the updated balance includes the following:

1. If the carrier and the client can communicate with each other by using the radio frequency signal, the balance in the first account recorded in the NFC module can be updated to the updated balance. For example, when the carrier is close to the device where the client is located, the balance in the first account in the NFC module in the carrier can be modified to the updated balance.

2. If the carrier is connected to the server by using a collection/payment device performing data collection/payment data with the carrier, the client requests the server to send the updated balance to the carrier, and then the device performing data collection/payment data with the carrier writes the updated balance into the carrier. For example, when the carrier is close to a collection/payment device such as a bus POS machine or a cash collection POS machine, the collection/payment device such as the bus POS machine or the cash collection POS machine can modify the balance recorded in the first account in the carrier to the updated balance.

In the first method for updating the balance in the first account to the updated balance, the user can perform an operation anywhere at any time, and the operation is convenient.

Based on the account processing method provided in this implementation of the present application, the balances in the first account and the second account can be synchronized, thereby implementing consistency between the first account and the second account.

The method is particularly applicable to but is not only applicable to a case that the carrier recording the first account cannot be connected to the server or the carrier cannot be connected to the server in real time.

Figure 10:
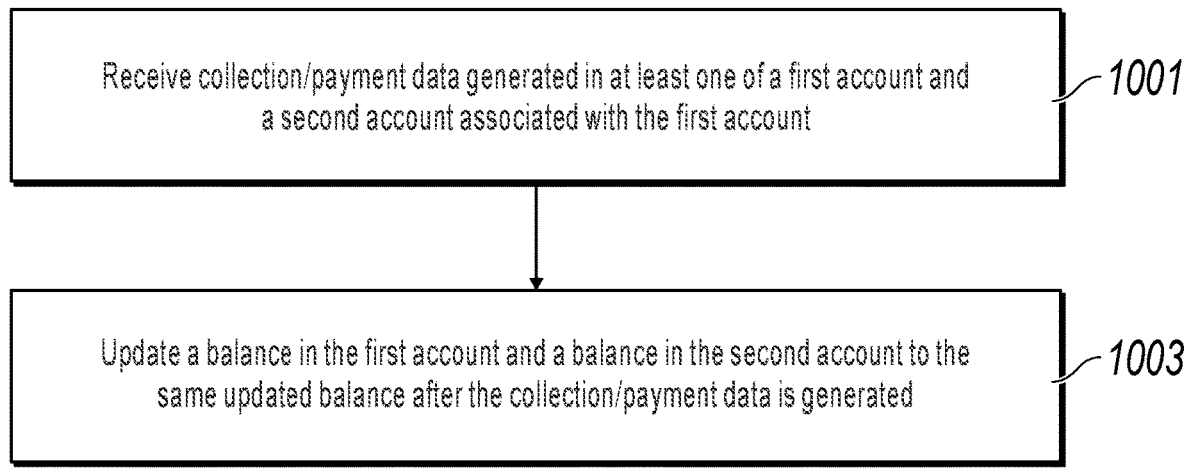
FIG. 10 is a schematic flowchart illustrating a data synchronization method, according to an implementation of the present application.

FIG. 10 is a schematic flowchart illustrating a data synchronization method, according to an implementation of the present application. The processing method is shown below. The processing method is performed by a server. The method is particularly applicable to but is not only applicable to a case that a carrier recording a first account can be conveniently connected to a server or connected to the server in real time.

Step 1001: Receive collection/payment data generated in at least one of a first account and a second account associated with the first account.

The collection/payment data generated in the first account is determined when a client obtains the first account from the carrier recording the first account, and the collection/payment data includes a refilling amount and a consumption amount.

Referring to the second method for obtaining the first account recorded in the carrier and the balance in the first account in step 803, the server can receive the collection/payment data generated in the first account by using a collection/payment device performing data collection and payment with the server. The server can directly receive the collection/payment data generated in the second account from the client storing the second account.

Step 1003: Update the balance in the first account and a balance in the second account to the same updated balance after the collection/payment data is generated.

The updated balance in the first account is written into the carrier by using the collection/payment device.

In this implementation of the present application, after the collection/payment data generated in at least one of the first account and the second account associated with the first account is received, the processing method can further include: determining at least one piece of collection/payment data received in an adjacent update period, where the update period is a time interval that the balances in the first account and the second account are updated to the same updated balance consecutive two times.

The updating the balance in the first account and a balance in the second account to an updated balance after the collection/payment data is generated includes: updating both the balance in the first account and the balance in the second account to the same updated balance after the collection/payment data is generated in the adjacent update period.

In this case, referring to the content in step 905, one of the first account and the second account is determined as a reference account. It is assumed that collection/payment data generated in the reference account is also generated in the other account, and an updated account is determined.

In this case, a plurality of pieces of collection/payment data can be processed simultaneously at each update, thereby improving processing efficiency.

In this implementation of the present application, the updating the balance in the first account and a balance in the second account to an updated balance after the collection/payment data is generated includes: each time collection/payment data is received, updating both the balance in the first account and the balance in the second account to the same updated balance after the collection/payment data is generated.

In this implementation of the present application, the processing method can further include the following:

If the received collection/payment data of the first account is less than the balance in the second account, sending reminding information to the client running the second account, and the reminding information is used to notify the user that balances are insufficient. In addition, the server can notify the collection/payment device that account balances are insufficient and the deduction cannot be completed.

This implementation of the present application provides another technical means for simultaneously updating the balances in the first account and the second account to the updated balance, so as to keep the balances in the first account and the second account consistent.

Figure 11:
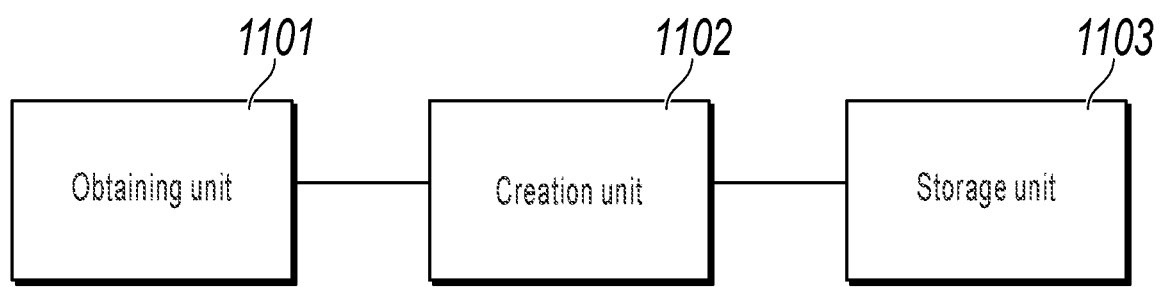
FIG. 11 is a schematic structural diagram illustrating an account creation device, according to an implementation of the present application.

FIG. 11 is a schematic structural diagram illustrating an account creation device, according to an implementation of the present application. The account creation device includes an obtaining unit 1101, a creation unit 1102, and a storage unit 1103.

The obtaining unit 1101 is configured to obtain an account identifier of a first account from a specified carrier by using a predetermined method.

The creation unit 1102 is configured to create an account identifier of a second account based on the account identifier of the first account.

The storage unit 1103 is configured to establish and store a mapping relationship between the account identifier of the first account and the account identifier of the second account.

In another implementation of the present application, that the obtaining unit 1101 obtains an account identifier of a first account from a specified carrier by using a predetermined method includes: establishing a data channel to the specified carrier by using a near field communications technology, and obtaining the account identifier of the first account from the specified carrier through the data channel.

In another implementation of the present application, that the obtaining unit 1101 obtains an account identifier of a first account from a specified carrier by using a predetermined method includes: obtaining the account identifier of the first account from the specified carrier through scanning.

In another implementation of the present application, the storage unit 1103 is configured to establish and store an association relationship between the account identifier of the second account and an application account used for payment after obtaining the account identifier of the second account.

In another implementation of the present application, the specified carrier includes at least one of a card apparatus supporting a near field communications technology, a second terminal device including the account identifier of the first account, or an application client including the account identifier of the first account.

In another implementation of the present application, the second account described here includes one of a virtual account and an electronic account.

It is worthwhile to note that the account creation device described in this implementation of the present application can be implemented by using software or hardware. Implementations are not specifically limited here.

Based on the same inventive concept, an implementation of the present application further provides an account creation device, including at least one memory and at least one processor. The memory stores a program, and the processor is configured to perform the following steps: obtaining an account identifier of a first account from a specified carrier by using a predetermined method; creating an account identifier of a second account based on the account identifier of the first account; and establishing and storing a mapping relationship between the account identifier of the first account and the account identifier of the second account.

For other functions of the processor, refer to content described in the previous implementation. Details are omitted here for simplicity.

Based on the same inventive concept, an implementation of the present specification further provides a computer readable storage medium. The computer readable storage medium includes a program used in combination with an electronic device, and a processor can execute the program to perform the following steps: obtaining an account identifier of a first account from a specified carrier by using a predetermined method; creating an account identifier of a second account based on the account identifier of the first account; and establishing and storing a mapping relationship between the account identifier of the first account and the account identifier of the second account.

For other functions of the processor, refer to content described in the previous implementation. Details are omitted here for simplicity.

Figure 12:
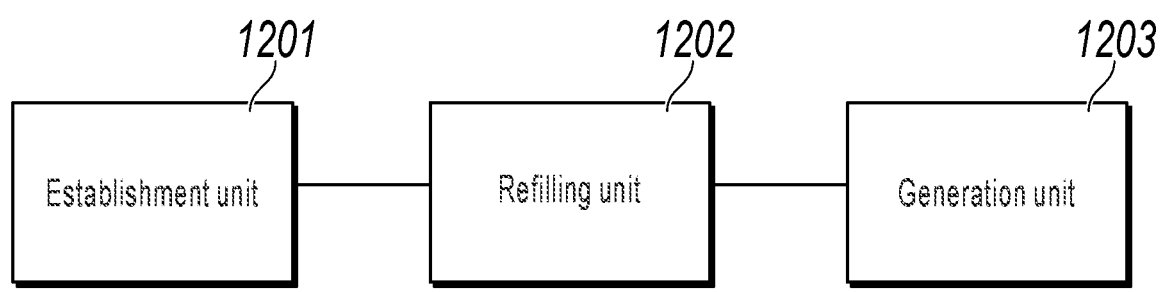
FIG. 12 is a schematic structural diagram illustrating an account refilling device, according to an implementation of the present application.

FIG. 12 is a schematic structural diagram illustrating an account refilling device, according to an implementation of the present application. The account refilling device includes an establishment unit 1201 and a refilling unit 1202.

The establishment unit 1201 is configured to establish a data channel to a specified carrier including an account identifier of a first account by using a near field communications technology.

The refilling unit 1202 is configured to write refilling data of a second account into the specified carrier through the data channel, to refill the first account.

In another implementation of the present application, the account refilling device further includes a generation unit 1203.

The generation unit 1203 is configured to perform a transfer operation for the second account by using an application account used for payment, to generate the refilling data of the second account.

In another implementation of the present application, the specified carrier includes at least one of a card apparatus supporting a near field communications technology, a second terminal device including the account identifier of the first account, or an application client including the account identifier of the first account.

It is worthwhile to note that the account refilling device described in this implementation of the present application can be implemented by using software or hardware. Implementations are not specifically limited here.

Based on the same inventive concept, an implementation of the present application provides an account refilling device, including at least one memory and at least one processor. The memory stores a program, and the processor is configured to perform the following steps: establishing a data channel to a specified carrier including an account identifier of a first account by using a near field communications technology; and writing refilling data of a second account into the specified carrier through the data channel, to refill the first account.

For other functions of the processor, refer to content described in the previous implementation. Details are omitted here for simplicity.

Based on the same inventive concept, an implementation of the present specification further provides a computer readable storage medium. The computer readable storage medium includes a program used in combination with an electronic device, and a processor can execute the program to perform the following steps: establishing a data channel to a specified carrier including an account identifier of a first account by using a near field communications technology; and writing refilling data of a second account into the specified carrier through the data channel, to refill the first account.

Figure 13:
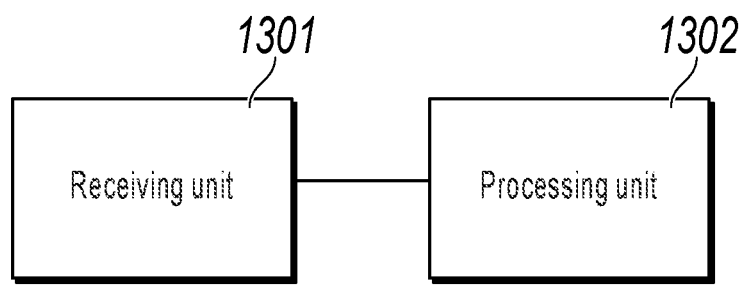
FIG. 13 is a schematic structural diagram illustrating an account refilling device, according to an implementation of the present application.

FIG. 13 is a schematic structural diagram illustrating an account refilling device, according to an implementation of the present application. The account refilling device includes a receiving unit 1301 and a processing unit 1302.

The receiving unit 1301 is configured to receive refilling data sent by a first terminal device when a data channel is established to the first terminal device by using a near field communications technology.

The processing unit 1302 is configured to process balance data of a first account based on the refilling data.

In another implementation of the present application, that the processing unit 1302 processes balance data of a first account based on the refilling data includes: writing the refilling data into the first account when the balance data of the first account is zero; or modifying the balance data of the first account by using the refilling data when the balance data of the first account is not zero.

It is worthwhile to note that the account refilling device described in this implementation of the present application can be implemented by using software or hardware. Implementations are not specifically limited here.

Based on the same inventive concept, an implementation of the present application provides an account refilling device, including at least one memory and at least one processor. The memory stores a program, and the processor is configured to perform the following steps: receiving refilling data sent by a first terminal device when a data channel is established to the first terminal device by using a near field communications technology; and processing balance data of a first account based on the refilling data.

For other functions of the processor, refer to content described in the previous implementation. Details are omitted here for simplicity.

Based on the same inventive concept, an implementation of the present specification further provides a computer readable storage medium. The computer readable storage medium includes a program used in combination with an electronic device, and a processor can execute the program to perform the following steps: receiving refilling data sent by a first terminal device when a data channel is established to the first terminal device by using a near field communications technology; and processing balance data of a first account based on the refilling data.

Figure 14:
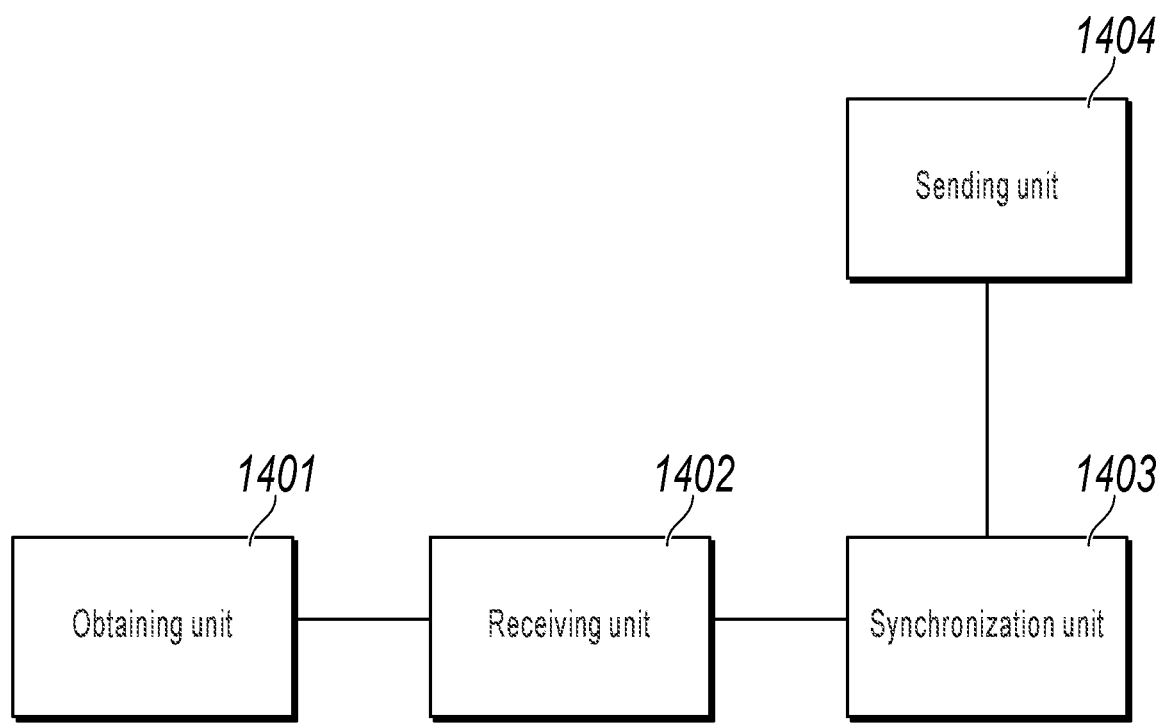
FIG. 14 is a schematic structural diagram illustrating a data synchronization device, according to an implementation of the present application.

FIG. 14 is a schematic structural diagram illustrating a data synchronization device, according to an implementation of the present application. The data synchronization device includes an obtaining unit 1401, a receiving unit 1402, and a synchronization unit 1403.

The obtaining unit 1401 is configured to obtain, through near field communication, an account identifier of a first account and first streaming data corresponding to the first account from a specified carrier.

The receiving unit 1402 is configured to receive an account identifier of a second account and second streaming data corresponding to the second account that are sent by a first terminal device.

The synchronization unit 1403 is configured to determine synchronization data in a synchronization period based on the first streaming data and the second streaming data, and send the synchronization data to the first terminal device, so that data corresponding to the second account is consistent with data corresponding to a primary account.

The data synchronization device described in this implementation of the present application can be applied to a server. An association relationship is established between the primary account included in the server and each of the first account included in the specified carrier and the second account included in the first terminal device.

In another implementation of the present application, that the obtaining unit 1401 obtains, through near field communication, an account identifier of a first account and first streaming data corresponding to the first account from a specified carrier includes: establishing a data channel to the specified carrier through near field communication; and obtaining, through the data channel, the account identifier of the first account and the first streaming data corresponding to the first account from the specified carrier when it is determined that a transaction occurs.

In another implementation of the present application, the data synchronization device further includes a sending unit 1404.

The sending unit 1404 is configured to send a deduction request to the first terminal device if the synchronization data is a negative number, where the deduction request is used to request to deduct an amount corresponding to the negative number from an application account associated with the second account and used for payment.

It is worthwhile to note that the data synchronization device described in this implementation of the present application can be implemented by using software or hardware. Implementations are not specifically limited here.

Based on the same inventive concept, an implementation of the present application provides a data synchronization device, including at least one memory and at least one processor. The memory stores a program, and the processor is configured to perform the following steps: obtaining, through near field communication, an account identifier of a first account and first streaming data corresponding to the first account from a specified carrier; receiving an account identifier of a second account and second streaming data corresponding to the second account that are sent by a first terminal device; and determining synchronization data in a synchronization period based on the first streaming data and the second streaming data, and sending the synchronization data to the first terminal device, so that data corresponding to the second account is consistent with data corresponding to a primary account.

An association relationship is established between the primary account included in a server and each of the first account included in the specified carrier and the second account included in the first terminal device.

For other functions of the processor, refer to content described in the previous implementation. Details are omitted here for simplicity.

Based on the same inventive concept, an implementation of the present specification further provides a computer readable storage medium. The computer readable storage medium includes a program used in combination with an electronic device, and a processor can execute the program to perform the following steps: obtaining, through near field communication, an account identifier of a first account and first streaming data corresponding to the first account from a specified carrier; receiving an account identifier of a second account and second streaming data corresponding to the second account that are sent by a first terminal device; and determining synchronization data in a synchronization period based on the first streaming data and the second streaming data, and sending the synchronization data to the first terminal device, so that data corresponding to the second account is consistent with data corresponding to a primary account.

An association relationship is established between the primary account included in a server and each of the first account included in the specified carrier and the second account included in the first terminal device.

Figure 15:
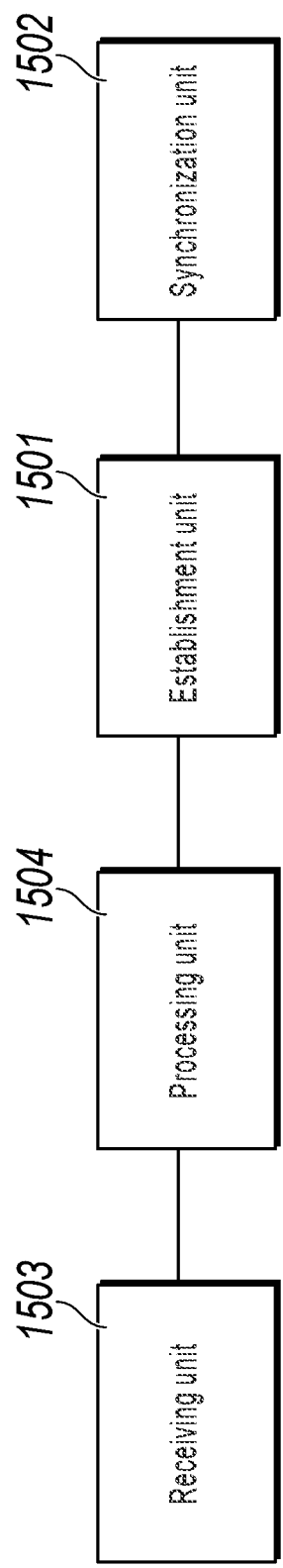
FIG. 15 is a schematic structural diagram illustrating a data synchronization device, according to an implementation of the present application.

FIG. 15 is a schematic structural diagram illustrating a data synchronization device, according to an implementation of the present application. The data synchronization device includes an establishment unit 1501 and a synchronization unit 1502.

The establishment unit 1501 is configured to establish a data channel to a specified carrier through near field communication.

The synchronization unit 1502 is configured to synchronize balance data corresponding to a second account to the specified carrier through the data channel, so that data corresponding to a first account included in the specified carrier is consistent with data corresponding to the second account.

In another implementation of the present application, the data synchronization device further includes a receiving unit 1503 and a processing unit 1504.

The receiving unit 1503 is configured to receive synchronization data sent by a server, where the synchronization data is obtained by the server by using the method described above.

The processing unit 1504 is configured to modify the data corresponding to the second account by using the synchronization data, so that the data corresponding to the second account is consistent with data corresponding to a primary account included in the server.

An association relationship is established between the primary account included in the server and each of the first account included in the specified carrier and the second account included in the first terminal device.

It is worthwhile to note that the data synchronization device described in this implementation of the present application can be implemented by using software or hardware. Implementations are not specifically limited here.

Based on the same inventive concept, an implementation of the present application provides a data synchronization device, including at least one memory and at least one processor. The memory stores a program, and the processor is configured to perform the following steps: establishing a data channel to a specified carrier through near field communication; and synchronizing balance data corresponding to a second account to the specified carrier through the data channel, so that data corresponding to a first account included in the specified carrier is consistent with data corresponding to the second account.

For other functions of the processor, refer to content described in the previous implementation. Details are omitted here for simplicity.

Based on the same inventive concept, an implementation of the present specification further provides a computer readable storage medium. The computer readable storage medium includes a program used in combination with an electronic device, and a processor can execute the program to perform the following steps: establishing a data channel to a specified carrier through near field communication; and synchronizing balance data corresponding to a second account to the specified carrier through the data channel, so that data corresponding to a first account included in the specified carrier is consistent with data corresponding to the second account.

Figure 16:
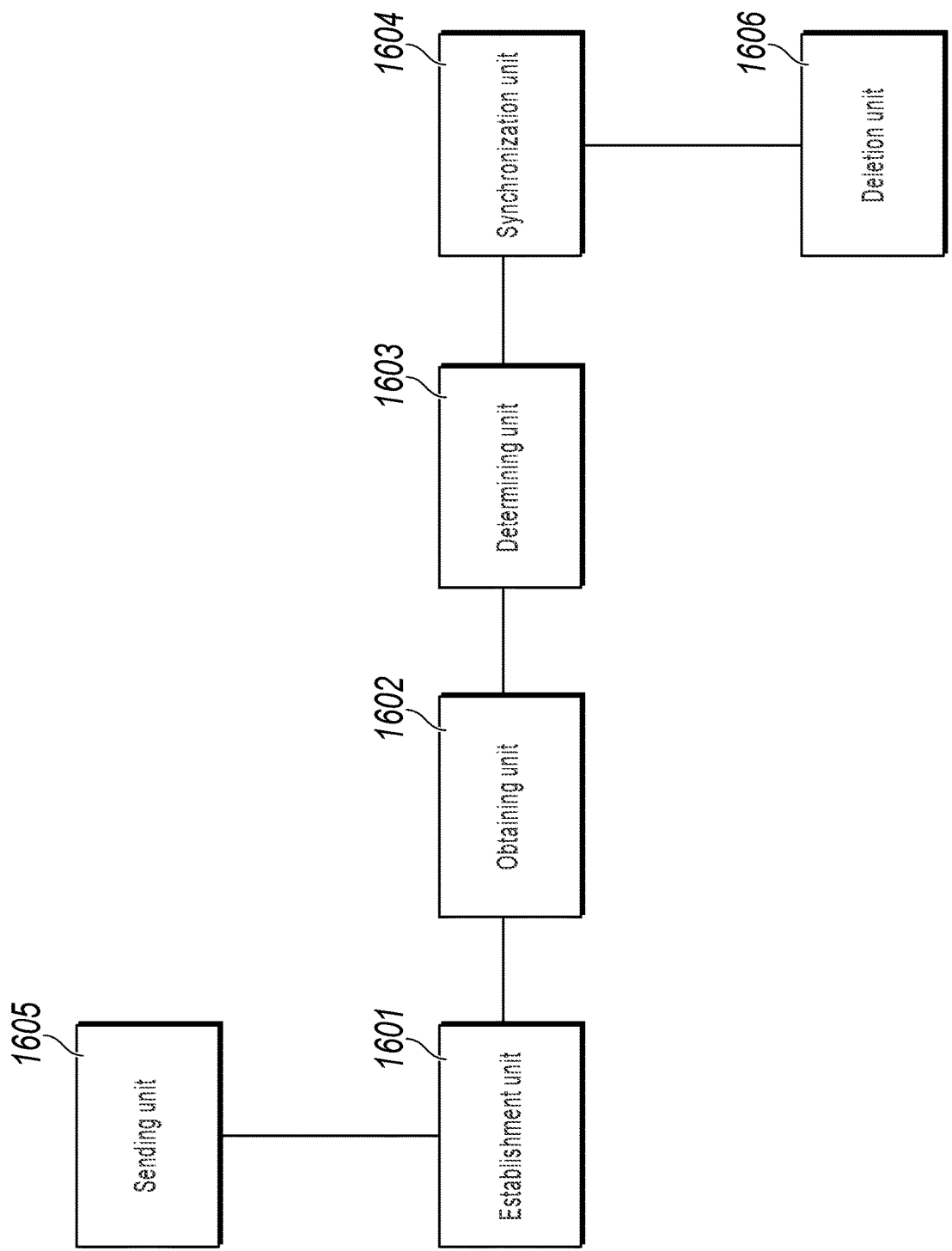
FIG. 16 is a schematic structural diagram illustrating a data synchronization device, according to an implementation of the present application.

FIG. 16 is a schematic structural diagram illustrating a data synchronization device, according to an implementation of the present application. The data synchronization device includes an establishment unit 1601, an obtaining unit 1602, a determining unit 1603, and a synchronization unit 1604.

The establishment unit 1601 is configured to establish a data channel to a specified carrier through near field communication.

The obtaining unit 1602 is configured to obtain, through the data channel, an account identifier of a first account and first streaming data corresponding to the first account that are included in the specified carrier.

The determining unit 1603 is configured to determine second streaming data corresponding to a second account associated with the first account.

The synchronization unit 1604 is configured to perform data synchronization between the first account and the second account based on the first streaming data and the second streaming data.

In another implementation of the present application, the data synchronization device further includes a sending unit 1605.

The sending unit 1605 is configured to: before the data channel is established, send prompt information if it is detected that data corresponding to the second account associated with the first account changes, where the prompt information is used to prompt a user to perform data synchronization between the first account and the second account.

In another implementation of the present application, that the determining unit 1603 determines second streaming data corresponding to a second account associated with the first account includes: determining an account identifier of the second account based on the account identifier of the first account, where an association relationship is established between the account identifier of the second account and the account identifier of the first account; and searching the second streaming data based on the account identifier of the second account, where a corresponding relationship is established between the second streaming data and the account identifier of the second account.

In another implementation of the present application, that the synchronization unit 1604 performs data synchronization between the first account and the second account based on the first streaming data and the second streaming data includes: calculating synchronization data used for synchronization based on the first streaming data and the second streaming data; and separately synchronizing the synchronization data to the first account and the second account.

In another implementation of the present application, that the synchronization unit 1604 synchronizes the synchronization data to the first account and the second account includes: separately writing null into the first account and the second account if the synchronization data is a negative number; and deducting an amount corresponding to the negative number from an application account associated with the second account and used for payment.

In another implementation of the present application, the data synchronization device further includes a deletion unit 1606.

The deletion unit 1606 is configured to send a synchronization time, the account identifier of the first account, and the first streaming data to a server, and delete the first streaming data recorded in a carrier including the first account; and/or send a synchronization time, an account identifier of the second account, and the second streaming data to a server, and delete the second streaming data.

In another implementation of the present application, the streaming data includes at least one of consumption data or refilling data.

It is worthwhile to note that the data synchronization device described in this implementation of the present application can be implemented by using software or hardware. Implementations are not specifically limited here.

Based on the same inventive concept, an implementation of the present application provides a data synchronization device, including at least one memory and at least one processor. The memory stores a program, and the processor is configured to perform the following steps: establishing a data channel to a specified carrier through near field communication; obtaining, through the data channel, an account identifier of a first account and first streaming data corresponding to the first account that are included in the specified carrier; determining second streaming data corresponding to a second account associated with the first account; and performing data synchronization between the first account and the second account based on the first streaming data and the second streaming data.

For other functions of the processor, refer to content described in the previous implementation. Details are omitted here for simplicity.

Based on the same inventive concept, an implementation of the present specification further provides a computer readable storage medium. The computer readable storage medium includes a program used in combination with an electronic device, and a processor can execute the program to perform the following steps: establishing a data channel to a specified carrier through near field communication; obtaining, through the data channel, an account identifier of a first account and first streaming data corresponding to the first account that are included in the specified carrier; determining second streaming data corresponding to a second account associated with the first account; and performing data synchronization between the first account and the second account based on the first streaming data and the second streaming data.

In the technical solutions provided in the implementations of the present application, the second account is created for the first account included in the specified carrier in the terminal device, and the first account is refilled through near field communication by using the second account in the terminal device, to ensure data consistency between the first account and the second account. To be specific, assuming that the first account is an account included in the specified carrier and the second account is a virtual electronic account associated with the first account, a user can complete a transaction by using the first account or the second account. In addition, in the technical solutions provided in the implementations of the present application, data consistency between the two accounts can be ensured, thereby improving payment experience of the user.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. A designer performs programming to "integrate" a digital system to a single PLD, without requiring a chip manufacturer to design and manufacture a dedicated integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component; or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. For example, the computer can be a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the apparatus above is described by dividing functions into various units. Certainly, when the present application is implemented, a function of each unit can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the other programmable data processing device generate an apparatus for implementing a specific function in one or more processes in the flowcharts and/or in one or more blocks in the block diagrams.

These computer program instructions can be stored in a computer readable memory that can instruct the computer or the other programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

In a typical configuration, a calculating device includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) and/or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible by the calculating device. Based on the definition in the present specification, the computer readable medium does not include transitory computer readable media (transitory media) such as a modulated data signal and carrier.

It is worthwhile to further note that, the terms "include", "comprise", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations of the present application are described in a progressive way. For same or similar parts of the implementations, references can be made to the implementations. Each implementation focuses on a difference from other implementations. Particularly, a system implementation is basically similar to a method implementation, and therefore is described briefly. For related parts, refer to related descriptions by using the method implementation.

The previous implementations are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method for data synchronization, comprising:
　establishing, by a terminal device, a data channel to an integrated circuit (IC) device through near field communication (NFC), wherein the IC device comprises an NFC module;
　obtaining, by the terminal device and through the data channel, an account identifier of a first account and first transaction data corresponding to the first account from the IC device, wherein the account identifier of the first account and the first transaction data are stored in the IC device;
　determining, by the terminal device, second transaction data corresponding to a second account associated with the first account, wherein the second transaction data is stored in the terminal device; and performing, by the terminal device, data synchronization between the first account and the second account based on the first transaction data and the second transaction data, wherein the data synchronization is performed through the data channel established between the terminal device and the IC device, wherein performing data synchronization between the first account and the second account based on the first transaction data and the second transaction data comprises:
- determining at least one piece of collection or payment data generated in the second account and a balance in the second account, wherein the collection or payment data comprise at least one of a consumption or refilling amount;
- determining an updated balance based on a balance in the first account and the at least one piece of collection or payment data generated in the second account; and
- updating the balance in the first account and the balance in the second account to the updated balance.

2. The computer-implemented method according to claim 1, further comprising:
- sending, by the terminal device before establishing the data channel, prompt information in response to detecting changes to data corresponding to the second account, wherein the prompt information is used to prompt a user to perform data synchronization between the first account and the second account.

3. The computer-implemented method according to claim 1, wherein determining the second transaction data comprises:
- determining an account identifier of the second account based on the account identifier of the first account, wherein an association is pre-established between the account identifier of the second account and the account identifier of the first account; and
- determining the second transaction data based on the account identifier of the second account, wherein a correspondence is pre-established between the second transaction data and the account identifier of the second account.

4. The computer-implemented method according to claim 1, wherein performing the data synchronization between the first account and the second account based on the first transaction data and the second transaction data comprises:
- determining synchronization data based on the first transaction data and the second transaction data; and
- separately synchronizing the synchronization data to the first account and the second account.

5. The computer-implemented method according to claim 4, wherein separately synchronizing the synchronization data to the first account and the second account comprises:
- separately writing a null value into the first account and the second account in response to determining that the synchronization data is a negative number; and
- computing a deduction corresponding to the negative number from an application account that is associated with the second account and that is used for payment.

6. The computer-implemented method according to claim 1, wherein the method further comprises at least one of the following:
- sending a synchronization time, the account identifier of the first account, and the first transaction data to a server; and deleting the first transaction data recorded in the IC device comprising the first account; or
- sending a synchronization time, an account identifier of the second account, and the second transaction data to a server; and deleting the second transaction data.

7. The computer-implemented method according to claim 1, wherein the second transaction data comprises at least one of consumption data or refilling data.

8. A non-transitory, computer-readable medium storing one or more instructions executable by a computer system to perform operations comprising:
- establishing, by a terminal device, a data channel to an integrated circuit (IC) device through near field communication (NFC), wherein the IC device comprises an NFC module;
- obtaining, by the terminal device and through the data channel, an account identifier of a first account and first transaction data corresponding to the first account from the IC device, wherein the account identifier of the first account and the first transaction data are stored in the IC device;
- determining, by the terminal device, second transaction data corresponding to a second account associated with the first account, wherein the second account is stored in the terminal device; and
- performing, by the terminal device, data synchronization between the first account and the second account based on the first transaction data and the second transaction data, wherein the data synchronization is performed through the data channel established between the terminal device and the IC device, wherein performing data synchronization between the first account and the second account based on the first transaction data and the second transaction data comprises:
  - determining at least one piece of collection or payment data generated in the second account and a balance in the second account, wherein the collection or payment data comprise at least one of a consumption or refilling amount;
  - determining an updated balance based on a balance in the first account and the at least one piece of collection or payment data generated in the second account; and
  - updating the balance in the first account and the balance in the second account to the updated balance.

9. The non-transitory, computer-readable medium of claim 8, wherein the operations further comprise:
- sending, by the terminal device before establishing the data channel, prompt information in response to detecting changes to data corresponding to the second account, wherein the prompt information is used to prompt a user to perform data synchronization between the first account and the second account.

10. The non-transitory, computer-readable medium of claim 8, wherein determining the second transaction data comprises:
- determining an account identifier of the second account based on the account identifier of the first account, wherein an association is pre-established between the account identifier of the second account and the account identifier of the first account; and
- determining the second transaction data based on the account identifier of the second account, wherein a correspondence is pre-established between the second transaction data and the account identifier of the second account.

11. The non-transitory, computer-readable medium of claim 8, wherein performing the data synchronization between the first account and the second account based on the first transaction data and the second transaction data comprises:
   determining synchronization data based on the first transaction data and the second transaction data; and
   separately synchronizing the synchronization data to the first account and the second account.

12. The non-transitory, computer-readable medium of claim 11, wherein separately synchronizing the synchronization data to the first account and the second account comprises:
   separately writing a null value into the first account and the second account in response to determining that the synchronization data is a negative number; and
   computing a deduction corresponding to the negative number from an application account that is associated with the second account and that is used for payment.

13. The non-transitory, computer-readable medium of claim 8, wherein the operations further comprise at least one of the following:
   sending a synchronization time, the account identifier of the first account, and the first transaction data to a server; and deleting the first transaction data recorded in the IC device comprising the first account; or
   sending a synchronization time, an account identifier of the second account, and the second transaction data to a server; and deleting the second transaction data.

14. The non-transitory, computer-readable medium of claim 8, wherein the second transaction data comprises at least one of consumption data or refilling data.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      establishing, by a terminal device, a data channel to an integrated circuit (IC) device through near field communication (NFC), wherein the IC device comprises an NFC module;
      obtaining, by the terminal device and through the data channel, an account identifier of a first account and first transaction data corresponding to the first account from the IC device, wherein the account identifier of the first account and the first transaction data are stored in the IC device;
      determining, by the terminal device, second transaction data corresponding to a second account associated with the first account, wherein the second transaction data is stored in the terminal device; and
      performing, by the terminal device, data synchronization between the first account and the second account based on the first transaction data and the second transaction data, wherein the data synchronization is performed through the data channel established between the terminal device and the IC device, wherein performing data synchronization between the first account and the second account based on the first transaction data and the second transaction data comprises:
         determining at least one piece of collection or payment data generated in the second account and a balance in the second account, wherein the collection or payment data comprise at least one of a consumption or refilling amount;
         determining an updated balance based on a balance in the first account and the at least one piece of collection or payment data generated in the second account; and
         updating the balance in the first account and the balance in the second account to the updated balance.

16. The computer-implemented system of claim 15, wherein the one or more operations further comprise:
   sending, by the terminal device before establishing the data channel, prompt information in response to detecting changes to data corresponding to the second account, wherein the prompt information is used to prompt a user to perform data synchronization between the first account and the second account.

17. The computer-implemented system of claim 15, wherein determining the second transaction data comprises:
   determining an account identifier of the second account based on the account identifier of the first account, wherein an association is pre-established between the account identifier of the second account and the account identifier of the first account; and
   determining the second transaction data based on the account identifier of the second account, wherein a correspondence is pre-established between the second transaction data and the account identifier of the second account.

18. The computer-implemented system of claim 15, wherein performing the data synchronization between the first account and the second account based on the first transaction data and the second transaction data comprises:
   determining synchronization data based on the first transaction data and the second transaction data; and
   separately synchronizing the synchronization data to the first account and the second account.

19. The computer-implemented system of claim 18, wherein separately synchronizing the synchronization data to the first account and the second account comprises:
   separately writing a null value into the first account and the second account in response to determining that the synchronization data is a negative number; and
   computing a deduction corresponding to the negative number from an application account that is associated with the second account and that is used for payment.

20. The computer-implemented system of claim 15, wherein the one or more operations further comprise at least one of the following:
   sending a synchronization time, the account identifier of the first account, and the first transaction data to a server; and deleting the first transaction data recorded in the IC device comprising the first account; or
   sending a synchronization time, an account identifier of the second account, and the second transaction data to a server; and deleting the second transaction data.

* * * * *